US012257594B2

(12) United States Patent
Ross et al.

(10) Patent No.: US 12,257,594 B2
(45) Date of Patent: *Mar. 25, 2025

(54) MIX CHAMBER FOR A PLURAL COMPONENT SPRAYER

(71) Applicant: Graco Minnesota Inc., Minneapolis, MN (US)

(72) Inventors: Daniel P. Ross, Vadnais Heights, MN (US); Joseph E. Tix, Hastings, MN (US); Samuel R. Stewart, Minneapolis, MN (US); Mark T. Weinberger, Mounds View, MN (US); Christopher J. Pellin, Victoria, MN (US); Jeffrey N. Velgersdyk, Minnetonka, MN (US); Jack A. Bosak, Coon Rapids, MN (US); Jacob R. Whiteoak, Blaine, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,068

(22) Filed: Jan. 22, 2024

(65) Prior Publication Data

US 2024/0207875 A1 Jun. 27, 2024

Related U.S. Application Data

(60) Continuation of application No. 17/886,667, filed on Aug. 12, 2022, now Pat. No. 11,896,992, which is a (Continued)

(51) Int. Cl.

*B05B 7/04* (2006.01)
*B01F 35/52* (2022.01)

(Continued)

(52) U.S. Cl.

CPC .......... *B05B 7/0408* (2013.01); *B01F 35/522* (2022.01); *B05B 7/04* (2013.01); *B05B 7/08* (2013.01); *B05B 7/1254* (2013.01)

(58) Field of Classification Search

CPC ........... B05B 7/0408; B05B 7/04; B05B 7/08; B05B 7/1254

(Continued)

(56) References Cited

U.S. PATENT DOCUMENTS 3,289,502 A 12/1966 Jessen
3,399,837 A 9/1968 Frick (Continued)

FOREIGN PATENT DOCUMENTS

CA 2713643 A1 2/2012
CA 2998798 A1 9/2018

(Continued)

OTHER PUBLICATIONS

First Canadian Office Action for CA Application No. 3111295, Dated Apr. 28, 2021, pp. 4.

(Continued)

*Primary Examiner* — Christopher S Kim
(74) *Attorney, Agent, or Firm* — Kinney & Lange, P.A.

(57) ABSTRACT

A mix chamber for a plural component sprayer is configured to receive first and second component materials and emit a spray of a resulting plural component material. The mix chamber includes a chamber body extending between a first end and a second end and including flat lateral sides. A ramp feature is disposed proximate the first end and is configured to contact and push first and second side seals, respectively, away from a body axis as the mix chamber shifts in a first direction through a cartridge bore to increase a gap between the first side seal and the second side seal such that the first (Continued)

side seal engages the first flat lateral side and the second side seal engages the second flat lateral side.

20 Claims, 16 Drawing Sheets

Related U.S. Application Data division of application No. 16/664,073, filed on Oct. 25, 2019, now Pat. No. 11,413,635.

(60) Provisional application No. 62/800,659, filed on Feb. 4, 2019, provisional application No. 62/751,148, filed on Oct. 26, 2018.

(51) Int. Cl.
*B05B 7/08* (2006.01)
*B05B 7/12* (2006.01)

(58) Field of Classification Search
USPC .................................... 239/413, 416, 417.5
See application file for complete search history.

(56) References Cited

U.S. PATENT DOCUMENTS

| | | | |
|---|---|---|---|
| 3,437,273 | A | 4/1969 | Hagfors |
| 3,488,004 | A | 1/1970 | Peeps |
| 3,708,123 | A | 1/1973 | Krueger |
| 3,796,990 | A | 3/1974 | Hill |
| 3,799,403 | A | 3/1974 | Probst et al. |
| 3,837,575 | A | 9/1974 | Lehnert |
| 4,117,551 | A | 9/1978 | Brooks et al. |
| 4,193,546 | A | 3/1980 | Goelz et al. |
| 4,453,670 | A | 6/1984 | Sirovy |
| 4,676,437 | A | 6/1987 | Brown |
| 4,708,292 | A | 11/1987 | Gammons |
| 4,913,317 | A | 4/1990 | Wernicke |
| 5,086,949 | A | 2/1992 | Vulpitta et al. |
| 5,090,814 | A | 2/1992 | Petcen |
| 5,104,006 | A | 4/1992 | Brown |
| 5,129,581 | A | 7/1992 | Braun et al. |
| 5,163,584 | A | 11/1992 | Huber et al. |
| 5,219,097 | A | 6/1993 | Huber et al. |
| 5,299,740 | A | 4/1994 | Bert |
| 5,429,308 | A | 7/1995 | Brown |
| 5,609,302 | A | 3/1997 | Smith |
| 5,829,680 | A | 11/1998 | Perret |
| 5,884,847 | A | 3/1999 | Christopher |
| 6,264,113 | B1 | 7/2001 | Dingler |
| 6,283,329 | B1 | 9/2001 | Bezaire et al. |
| 6,312,293 | B1 | 11/2001 | Wang |
| 6,315,161 | B1 | 11/2001 | Bezaire et al. |
| 6,820,315 | B1 | 11/2004 | Hans et al. |
| 6,824,075 | B2 | 11/2004 | Zimmermann |
| 6,884,230 | B1 | 4/2005 | Epstein et al. |
| 6,981,478 | B2 | 1/2006 | Schaefer et al. |
| 7,059,545 | B2 | 6/2006 | Reetz |
| 7,182,221 | B2 | 2/2007 | Hanna et al. |
| 7,222,753 | B2 | 5/2007 | Hayduk |
| 7,377,404 | B2 | 5/2008 | Cherfane |
| 7,527,172 | B2 | 5/2009 | McMichael |
| 7,552,847 | B2 | 6/2009 | Hayduk |
| 7,661,606 | B2 | 2/2010 | Vacher |
| 7,694,893 | B2 | 4/2010 | Zittel et al. |
| 8,365,958 | B2 | 2/2013 | Ho et al. |
| 8,590,809 | B2 | 11/2013 | Escoto et al. |
| 8,684,035 | B2 | 4/2014 | Bernhard |
| 8,726,831 | B2 | 5/2014 | Mather et al. |
| 8,875,950 | B2 | 11/2014 | Hayduk |
| 8,899,501 | B2 | 12/2014 | Fox et al. |
| 8,931,715 | B2 | 1/2015 | Courier |
| 8,991,729 | B2 | 3/2015 | Scherer |
| 9,038,929 | B1 | 5/2015 | Commette |
| 9,192,950 | B2 | 11/2015 | Carleton et al. |
| 9,433,955 | B2 | 9/2016 | Haralson |
| 10,610,879 | B2 | 4/2020 | Duong et al. |
| 10,702,877 | B2 | 7/2020 | Ellis et al. |
| 11,135,609 | B2 | 10/2021 | Corona et al. |
| 11,213,840 | B2 | 1/2022 | Owens et al. |
| 11,413,635 | B2 | 8/2022 | Ross et al. |
| 11,633,748 | B2 | 4/2023 | Ross et al. |
| 11,896,992 | B2 * | 2/2024 | Ross .................... B05B 7/0408 |
| 2003/0051870 | A1 | 3/2003 | Robertson |
| 2005/0035220 | A1 | 2/2005 | Brown |
| 2007/0034716 | A1 | 2/2007 | Zittel et al. |
| 2007/0170282 | A1 | 7/2007 | McMichael |
| 2008/0257979 | A1 | 10/2008 | Crawford |
| 2010/0065130 | A1 | 3/2010 | Swab et al. |
| 2011/0062702 | A1 | 3/2011 | Pellin et al. |
| 2011/0100364 | A1 | 5/2011 | Faram |
| 2012/0181347 | A1 | 7/2012 | Scherer |
| 2013/0092247 | A1 | 4/2013 | Lee et al. |
| 2013/0292491 | A1 | 11/2013 | Cvetezar et al. |
| 2013/0320110 | A1 | 12/2013 | Brose et al. |
| 2014/0048627 | A1 | 2/2014 | Schmon et al. |
| 2014/0103144 | A1 | 4/2014 | Haralson |
| 2014/0224898 | A1 | 8/2014 | Courier |
| 2016/0008825 | A1 | 1/2016 | Drozd |
| 2016/0361734 | A1 | 12/2016 | Routen et al. |
| 2018/0104854 | A1 | 4/2018 | Sinders et al. |
| 2018/0126396 | A1 | 5/2018 | Ellis et al. |
| 2020/0038889 | A1 | 2/2020 | Volk et al. |
| 2021/0154694 | A1 | 5/2021 | Masse |

FOREIGN PATENT DOCUMENTS

| | | | |
|---|---|---|---|
| CN | 1700527 | A | 11/2005 |
| CN | 101537399 | A | 9/2009 |
| CN | 103769321 | A | 5/2014 |
| EP | 0063707 | A1 | 11/1982 |
| ES | 2364029 | T3 | 8/2011 |
| GB | 1381556 | A | 1/1975 |

OTHER PUBLICATIONS

First Chinese Office Action for CN Application No. 201980070293.1, Dated Feb. 9, 2022, pp. 19.

First Chinese Office Action for CN Application No. 201980070370.3, Dated Feb. 9, 2022, pp. 22.

Fourth Canadian Office Action for CA Application No. 3111295, Dated Jun. 13, 2023, pp. 3.

International Preliminary Report on Patentability for PCT Application No. PCT/US2019/058095, Dated Apr. 27, 2021, pp. 12.

International Preliminary Report on Patentability for PCT Application No. PCT/US2019/058101, Dated Apr. 27, 2021, pp. 10.

International Search Report and Written Opinion for PCT Application No. PCT/US2019/058095, Dated Feb. 7, 2020, pp. 17.

International Search Report and Written Opinion for PCT Application No. PCT/US2019/058101, Dated Feb. 7, pp. 14.

Second Canadian Office Action for CA Application No. 3111295, Dated Sep. 28, 2021, pp. 3.

Second Chinese Office Action for CN Application No. 201980070293.1, Dated Sep. 28, 2022, pp. 20.

Second Chinese Office Action for CN Application No. 201980070370.3, Dated Oct. 31, 2022, pp. 27.

Third Canadian Office Action for CA Application No. 3111295, Dated Aug. 3, 2022, pp. 3.

Fifth Canadian Office Action for CA Application No. 3111295, Dated Nov. 2, 2023, pp. 3.

Extended European Search Report for EP Application No. 24152565.8, Dated Apr. 30, 2024, pp. 13.

First Australian Exam Report for AU Application No. 2019368102, Dated Jul. 18, 2024, pp. 3.

First Communication Pursuant to Article 94(3) EPC for EP Application No. 19805005.6, Dated Jul. 30, 2024, pp. 12.

* cited by examiner

MIX CHAMBER FOR A PLURAL COMPONENT SPRAYER

CROSS-REFERENCE TO RELATED APPLICATION(S)

This application is a continuation of a U.S. application Ser. No. 17/886,667 filed Aug. 12, 2022 and entitled "MIX CHAMBER FOR A PLURAL COMPONENT SPRAYER," which is a divisional of U.S. application Ser. No. 16/664,073, filed Nov. 25, 2019, and entitled "MIX CHAMBER FOR A PLURAL COMPONENT SPRAYER," now U.S. Pat. No. 11,413,635, which claims the benefit of U.S. Provisional Application No. 62/751,148, filed Oct. 26, 2018, and entitled "REPLACEABLE HEAD FOR PLURAL COMPONENT SPRAYER (GUN)," and claims the benefit of U.S. Provisional Application No. 62/800,659, filed Feb. 4, 2019, and entitled "MIXING CARTRIDGE AND MIXING CARTRIDGE ASSEMBLY FOR PLURAL COMPONENT SPRAYER," the disclosures of which are hereby incorporated by reference in their entireties.

BACKGROUND

This disclosure is related to sprayers. More particularly, this disclosure is related to plural component spray guns.

Plural component sprayers receive multiple component materials and combine the multiple component materials to form a plural component material. For example, some plural component sprayers receive catalysts, such as isocyanate, and resin that combine to form a spray foam. Spray foam insulation can be applied to substrates to provide thermal insulation. The spray gun is triggered to open a pathway out of the gun and eject the plural component material. The component materials can cross-over into the pathway of the other component material, which can lead to curing within the gun. Repair of a plural component sprayer requires disassembly of the entire fluid head for service, maintenance, and to address any issues that may have caused a failure to spray.

SUMMARY

According to one aspect of the disclosure, a mix chamber is configured to be disposed in a cartridge bore in a spray gun to receive a first component fluid from a first fluid channel in the spray gun and a second component fluid from a second fluid channel in the spray gun, a first side seal is disposed in the first fluid channel to seal against the mix chamber and a second side seal is disposed in the second fluid channel to seal against the mix chamber. The mix chamber includes a chamber body extending between a first end and a second end and elongate along a body axis, the chamber body including a first flat lateral side and a second flat lateral side. The mix chamber further includes a first inlet bore extending into the first flat lateral side and to a mix bore extending to a spray orifice, the first inlet bore configured to receive the first component fluid from the first fluid channel; a second inlet bore extending into the second flat lateral side and to the mix bore, the second inlet bore configured to receive the second component fluid from the second fluid channel; and a ramp feature disposed proximate the first end. The ramp feature is configured to contact and push the first and second side seals, respectively, away from the body axis as the mix chamber shifts in a first direction through the cartridge bore to increase a gap between the first side seal and the second side seal such that the first side seal engages the first lateral side and the second side seal engages the second lateral side.

According to another aspect of the present disclosure, a method of assembling in a plural component spray gun includes attaching a mix chamber to an actuator of the plural component spray gun; passing a fluid cartridge in a first direction and over the mix chamber such that the mix chamber enters a rear opening of a cartridge bore through the fluid cartridge; engaging first and second seal members disposed in the fluid cartridge with a ramp feature of the mix chamber, the ramp feature being a first part of the mix chamber to contact the first and second seal members, wherein the first and second seal members are pre-loaded such that spring forces bias the first and second seal members at least partially into the cartridge bore; pushing the first and second seal members away from a chamber axis with the ramp feature to widen a gap between the first and second seal members; and passing the first seal member onto a first flat lateral side of the mix chamber from the ramp feature and passing the second seal member onto a second flat lateral side of the mix chamber.

According to yet another aspect of the disclosure, a fluid cartridge for a plural component sprayer includes a cartridge body having a first end and a second end; a cartridge bore extending axially through the body between the first end and the second end; a first material flowpath extending from the second end to the cartridge bore and a second material flowpath extending from the second end to the cartridge bore; a first fluid check disposed in the first material path proximate a first inlet of the first material path and a second fluid check disposed in the second material path proximate a second inlet of the second material path, the first and second fluid checks disposed to prevent backflow of material through the first and second inlets; a first side seal disposed in the first material path proximate the cartridge bore, the first side seal including a first seal member and a first side spring biasing the first seal member at least partially into the cartridge bore such that the first side seal is pre-loaded; and a second side seal disposed in the second material path proximate the cartridge bore, the second side seal including a second seal member and a second side spring biasing the second seal member at least partially into the cartridge bore such that the second side seal is pre-loaded.

According to yet another aspect of the disclosure, a fluid cartridge for use in a plural component sprayer is configured to receive first and second component materials from the plural component sprayer and to receive purge air from the plural component sprayer. The fluid cartridge includes a cartridge body defining a cartridge bore; a first seal housing mounted to the cartridge body, the first seal housing including a first post extending rearward from the first seal housing and configured to be received in a first material port to receive the first component material from the first material port; a second seal housing mounted to the cartridge body, the second seal housing including a second post extending rearward from the second seal housing and configured to be received in a second material port to receive the second component material from the second material port; a third post extending rearward from the cartridge body and configured to be received in a purge port to receive purge air from the purge port; a first fluid check disposed in a first material path extending through the first seal housing from the first post to the cartridge bore; a second fluid check disposed in a second material path extending through the second seal housing from the second post to the cartridge bore; a third fluid check disposed in a purge path extending through the cartridge body from the third post to the a purge chamber in the cartridge bore; a first side seal disposed in the first material path proximate the cartridge bore, the first side seal including a first seal member and a first side spring biasing the first seal member at least partially into the cartridge bore such that the first side seal is pre-loaded; and a second side seal disposed in the second material path proximate the cartridge bore, the second side seal including a second seal member and a second side spring biasing the second seal member at least partially into the cartridge bore such that the second side seal is pre-loaded.

DETAILED DESCRIPTION

Figure 1A:
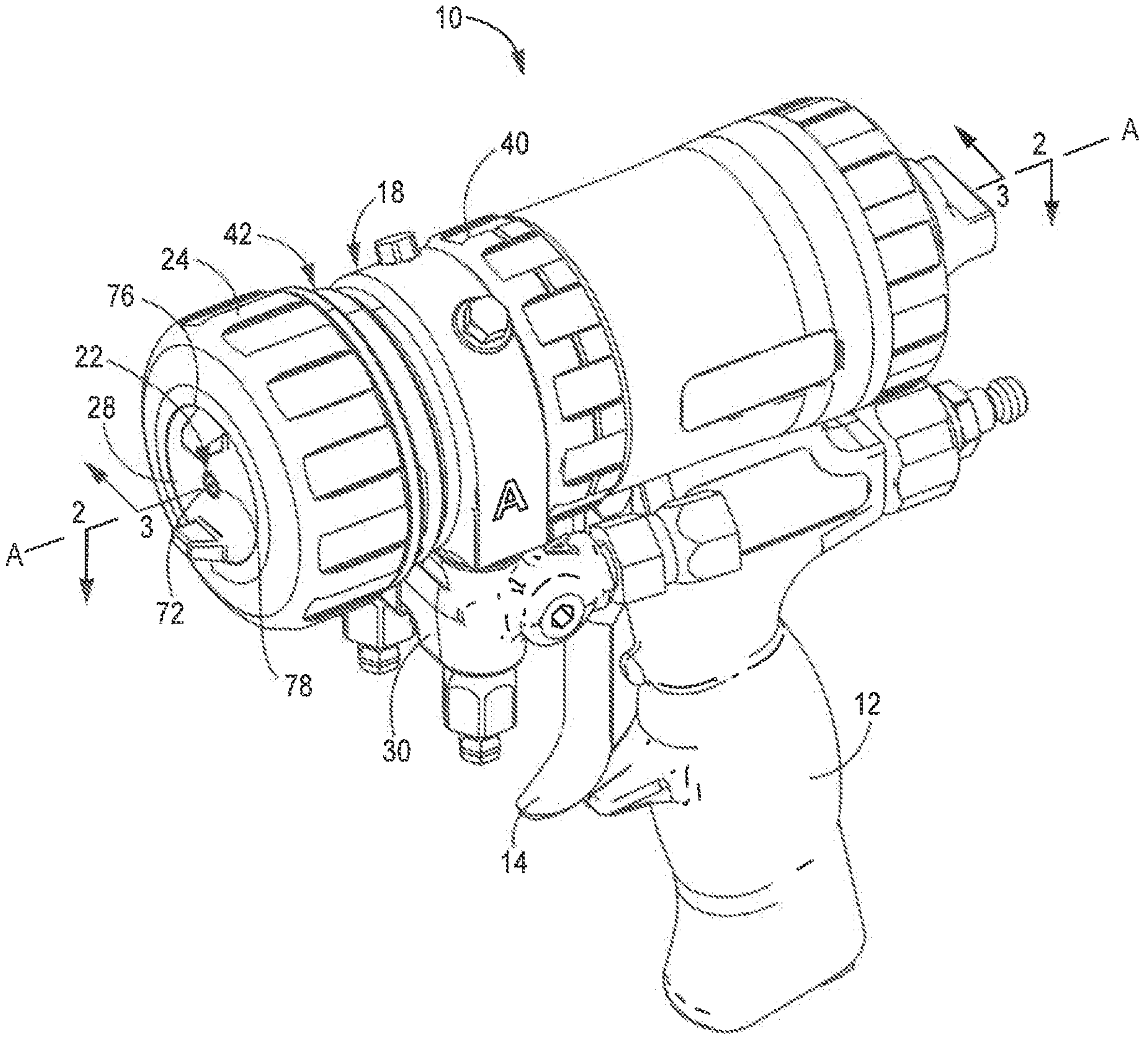
FIG. 1A is an isometric view of a plural component sprayer.
Figure 1B:
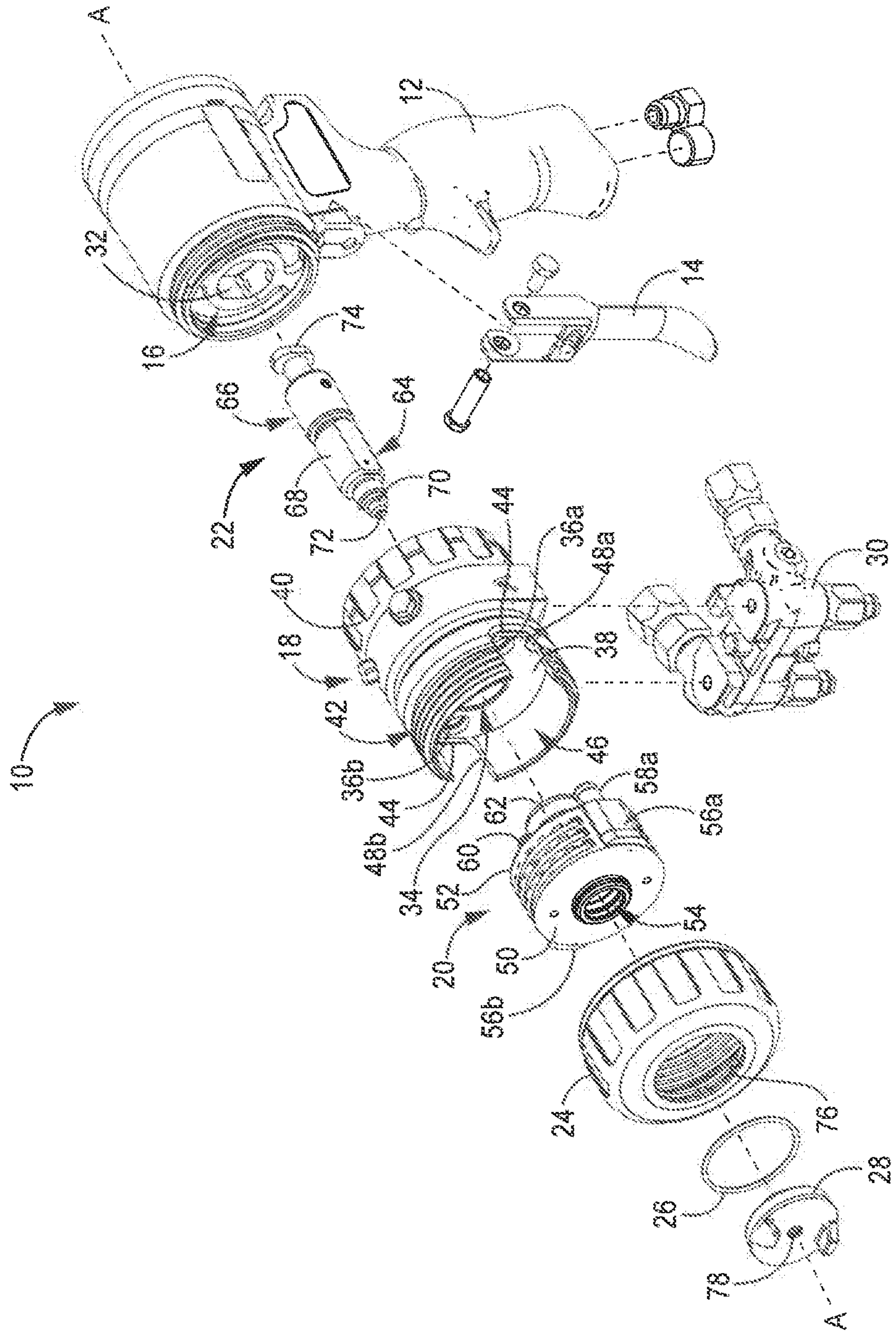
FIG. 1B is an exploded view of a plural component sprayer.

FIG. 1A is an isometric view of plural component sprayer 10. FIG. 1B is an exploded view of plural component sprayer 10. FIGS. 1A and 1B will be discussed together. Plural component sprayer 10 includes handle 12, trigger 14, actuator 16 (FIG. 1B), mounting head 18, fluid cartridge 20 (FIG. 1B), mix chamber assembly 22, retaining cap 24, cap seal 26 (FIG. 1B), air cap 28, and manifold 30. Actuator 16 includes tab lock 32 (FIG. 1B). Mounting head 18 includes central bore 34 (FIG. 1B); material ports 36*a*, 36*b* (FIG. 1B); chamber wall 38 (FIG. 1B); head connector 40; receiving portion 42; and pins 44 (FIG. 1B). Receiving portion 42 defines head chamber 46 (FIG. 1B) and includes slots 48*a*, 48*b* (FIG. 1B). Fluid cartridge 20 includes first end 50 (FIG. 1B), second end 52 (FIG. 1B), cartridge bore 54 (FIG. 1B), projections 56*a*, 56*b* (FIG. 1B), fluid posts 58*a*, 58*b* (FIG. 1B) (only one of which is shown), purge post 60 (FIG. 1B), and central extension 62 (FIG. 1B). Mix chamber assembly 22 includes mix chamber 64 (FIG. 1B) and chamber connector 66 (FIG. 1B). Body 68 (FIG. 1B), head 70 (FIG. 1B), and spray orifice 72 of mix chamber 64 are shown. Chamber connector 66 includes locking tab 74 (FIG. 1B). Retaining cap 24 includes cap bore 76. Air cap 28 includes opening 78.

Plural component sprayer 10 is configured to receive and mix multiple component materials to form a plural component material for application on a surface. The component materials are driven to plural component sprayer 10 by upstream pressure sources, such as pumps. The upstream pressures drive the component materials and the resulting plural component material through plural component sprayer 10 causing the spray. For example, plural component sprayer 10 can receive a first component material, such as a resin, and a second component material, such as a catalyst (e.g., isocyanate), that combine to form a spray foam. The spray foam is ejected in a spray from plural component sprayer 10 and applied to the surface.

Handle 12 is configured to be grasped by the hand of a user. Trigger 14 is pivotably mounted on the body of plural component sprayer 10. Trigger 14 can be actuated by the hand grasping handle 12. Trigger 14 controls spraying by plural component sprayer 10. Actuator 16 is disposed in a chamber within plural component sprayer 10. Tab lock 32 is formed on actuator 16 and secures mix chamber assembly 22 to actuator 16. Trigger 14 is configured to cause displacement of actuator 16, which in turn displaces mix chamber assembly 22 to control spraying by plural component sprayer 10. For example, actuator 16 can include a pneumatic piston disposed within plural component sprayer 10. In such an example, trigger 14 controls the flow of compressed air to the pneumatic piston to control displacement of the pneumatic piston.

Manifold 30 is attached to mounting head 18. Manifold 30 is configured to receive fluid lines (not shown) providing the first and second component materials to plural component sprayer 10. Manifold 30 provides the first and second component materials to mounting head 18. Manifold 30 can include internal valves that allow the user to turn off flow through manifold 30 during assembly and disassembly of plural component sprayer 10.

Mounting head 18 mounts to plural component sprayer 10. More specifically, head connector 40 of mounting head 18 secures mounting head 18 to plural component sprayer 10. In the example shown, head connector 40 and plural component sprayer 10 include interfaced threading. Head connector 40 is rotatable relative to mounting head 18 to thread onto plural component sprayer 10. It is understood, however, that mounting head 18 can be attached to plural component sprayer 10 in any desired manner. Central bore 34 extends axially through mounting head 18 on axis A-A. Material ports 36*a*, 36*b* are formed in mounting head 18 extend into chamber wall 38. Material ports 36*a*, 36*b* provide exit ports through which the first and second component materials can exit mounting head 18.

Receiving portion 42 extends from the body of mounting head 18 on an opposite side of the body from head connector 40. Chamber wall 38 defines a base of head chamber 46. Slots 48*a*, 48*b* extend axially into receiving portion 42 towards the body of mounting head 18. As shown, slots 48*a*,

48*b* are disposed on opposite lateral sides of receiving portion 42. Slots 48*a*, 48*b* can be offset by about 180-degrees. It is understood, however, that slots 48*a*, 48*b* can be disposed at any desired location on receiving portion 42. In addition, slots 48*a*, 48*b* can be offset by any desired degree. In some examples, mounting head 18 includes only a single slot 48*a*, 48*b*. In other examples, mounting head 18 includes more than two slots 48*a*, 48*b*, such as three, four, or more slots 48*a*, 48*b*. Slots 48*a*, 48*b* can provide mistake-proofing by preventing installation of any fluid cartridge 20 that cannot mate with slots 48*a*, 48*b* to mount in head chamber 46.

Pins 44 are disposed at the closed ends of slots 48*a*, 48*b* proximate the body of mounting head 18. Pins 44 are formed from a resilient material, such as hardened steel, and provide braces against which a user can brace a tool to facilitate removal of fluid cartridge 20 from mounting head 18. For example, the user can pry fluid cartridge 20 from mounting head 18 using a lever arm, such as a screwdriver, braced against one of pins 44. Pins 44 prevent the lever from damaging mounting head 18, which can be made from a less resilient material, such as plastic.

Fluid cartridge 20 is mounted within head chamber 46 of mounting head 18. Receiving portion 42 extends around fluid cartridge 20. Projections 56*a*, 56*b* extend into slots 48*a*, 48*b*, respectively. Projections 56*a*, 56*b* interfacing with slots 48*a*, 48*b* prevents undesired rotation of fluid cartridge 20 relative to mounting head 18. Cartridge bore 54 extends through fluid cartridge 20 and is disposed on axis A-A. Fluid posts 58*a*, 58*b* project from second end 52 of fluid cartridge 20. Fluid posts 58*a*, 58*b* extend into material ports 36*a*, 36*b* to form fluid connections between mounting head 18 and fluid cartridge 20. Fluid posts 58*a*, 58*b* receive the first and second component materials from mounting head 18. Purge post 60 projects from second end 52. Purge post 60 extends into a purge air port, such as purge port 136 (shown in FIGS. 3A and 3B), formed in chamber wall 38 of mounting head 18. Purge post 60 receives purge air from mounting head 18.

Fluid cartridge 20 incorporates approximately 15 parts of prior plural component heads into one cartridge, which results in quicker head changes compared to the prior plural component heads used to apply binary compounds, like epoxy, which required that the point where the two components combine be cleaned or replaced regularly in order to operate. In many embodiments, metal and/or plastic housings for A(iso) and B(resin) contain side seals, side seal o-rings, springs, check valves designed in a way for easy removal and replacement to minimize down time. Fluid cartridge 20 may be disposable to minimize servicing time and for easy preventive maintenance.

Mix chamber assembly 22 extends through central bore 34 and cartridge bore 54 and is movable along axis A-A. Mix chamber assembly 22 is movable between a spray state, where mix chamber 64 receives the first and second component materials and sprays a resulting plural component material through spray orifice 72, and a purge state, where mix chamber 64 receives purge air and sprays the purge air through spray orifice 72. Chamber connector 66 is mounted to mix chamber 64 to form mix chamber assembly 22.

Mix chamber assembly 22 is connected to actuator 16 such that actuator 16 drives mix chamber assembly 22 between the spray state and the purge state. Locking tab 74 projects from an end of chamber connector 66 opposite mix chamber 64. Locking tab 74 forms a mounting feature of mix chamber assembly 22. Locking tab 74 extends into tab lock 32 and is locked against axial displacement relative to actuator 16 by tab lock 32. As such, actuator 16 can drive mix chamber assembly 22 between the spray and purge states along axis A-A. Tab lock 32 can be formed on actuator 16 or on another component attached to actuator 16. The interface between mix chamber assembly 22 and actuator 16 facilitates simple and quick assembly and disassembly of plural component sprayer 10. Mix chamber assembly 22 is attached to actuator 16 by aligning locking tab 74 with the orientation of the opening of tab lock 32. Locking tab 74 is inserted into tab lock 32 through the opening and rotated such that locking flanges of tab lock 32 cover and axially secure locking tab 74 in tab lock 32. Mix chamber assembly 22 can be removed by reversing the twisting motion and pulling mix chamber assembly 22 axially away from tab lock 32. While mix chamber assembly 22 is described as mounting to actuator 16 by locking tab 74 and tab lock 32, it is understood that mix chamber assembly 22 can be mounted to actuator 16 via any suitable connecting interface.

Mix chamber 64 receives the first and second component material and emits the plural component material from spray orifice 72. Head 70 extends from an end of body 68 opposite chamber connector 66. Spray orifice 72 is formed in the end of head 70. Air cap 28 is configured to mount to head 70. In the example shown, air cap 28 and head 70 can include interfaced threading to secure air cap 28 to mix chamber 64. It is understood, however, that air cap 28 and mix chamber 64 can connect in any desired manner. With air cap 28 secured to mix chamber 64, spray orifice 72 is disposed at opening 78 of air cap 28. Air flows through openings (not shown) in air cap to assist in cleaning off of mix chamber 64.

Retaining cap 24 connects to receiving portion 42 and secures fluid cartridge 20 within head chamber 46. In the example shown, retaining cap 24 includes internal threading configured to interface with external threading on receiving portion 42. It is understood, however, that retaining cap 24 can be secured to receiving portion 42 in any desired manner. Retaining cap 24 includes cap bore 76 disposed on axis A-A. A portion of mix chamber 64 extends through cap bore 76. Cap seal 26 is disposed in retaining cap 24 about cap bore 76. Cap seal 26 interfaces with air cap 28 when mix chamber 64 is in the spray state to ensure that the clean-off air flows through air cap 28.

Plural component sprayer 10 can be easily assembled and disassembled. Plural component sprayer 10 thereby reduces downtime and increases the efficiency of spray operations. To assemble plural component sprayer 10, locking tab 74 is aligned with the opening in tab lock 32 and inserted into tab lock 32. Mix chamber assembly 22 is rotated, thereby securing locking tab 74 within tab lock 32. Mounting head 18 is passed over mix chamber assembly 22 such that mix chamber assembly 22 extends through central bore 34. Mounting head 18 is mounted to plural component sprayer 10 by head connector 40. Manifold 30 is attached to mounting head 18. Fluid cartridge 20 is inserted into head chamber 46 such that projections 56*a*, 56*b* are disposed in slots 48*a*, 48*b*. Fluid posts 58*a*, 58*b* extend into material ports 36*a*, 36*b*. Central extension 62 extends into central bore 34 and mix chamber assembly 22 passes through cartridge bore 54. Purge post 60 extends into the purge port. Retaining cap 24 is mounted on receiving portion 42 to secure fluid cartridge 20 within head chamber 46. Air cap 28 is attached to head 70 of mix chamber 64. Plural component sprayer 10 is thus ready to initiate spraying.

Plural component sprayer 10 can require disassembly and replacement of parts. Air cap 28 is detached from head 70 and retaining cap 24 is removed from receiving portion 42. Fluid cartridge 20 can then be pulled axially away from mounting head 18 and out of head chamber 46. The user can place a lever arm, such as a screwdriver, between pin 44 and a portion of fluid cartridge 20, such as projections 56*a*, 56*b*, and brace the lever arm against pin 44 to assist in removal of fluid cartridge 20 from head chamber 46. As discussed above, fluid cartridge 20 incorporates multiple replacement parts into a single module. A new fluid cartridge 20 can be mounted to mounting head 18. Plural component sprayer 10 can be reassembled and returned to operation.

In some cases, mix chamber assembly 22 may also require replacement. The user can remove mounting head 18 from plural component sprayer 10 to expose mix chamber assembly 22. Mix chamber assembly 22 is dismounted by rotating mix chamber assembly 22 and then pulling mix chamber assembly 22 axially away from actuator 16 such that locking tab 74 exits tab lock 32. A new mix chamber assembly 22 can be mounted to actuator 16 and plural component sprayer 10 can be quickly reassembled and returned to operation. Mix chamber assembly 22 facilitates tool-less replacement of mix chamber 64.

During operation, the first and second component materials enter manifold 30 and flow into mounting head 18. The first component material enters fluid cartridge 20 at fluid post 58*a*, which is disposed in material port 36*a*, and the second component material enters fluid cartridge 20 at fluid post 58*b*, which is disposed in material port 36*b*. Mix chamber 64 is initially in the purge state such that the first and second component materials are blocked from flowing to spray orifice 72, as discussed further herein.

The user actuates trigger 14, which activates actuator 16 such that mix chamber 64 shifts to the spray state. The component materials enter mix chamber 64 and mix together to form the plural component material. The plural component material flows through mix chamber 64 and is ejected as a spray through spray orifice 72. The upstream pressure driving the component materials to plural component sprayer 10 drives the first and second component materials, and the resulting plural component material, through manifold 30, mounting head 18, fluid cartridge 20, and mix chamber 64 and out through spray orifice 72.

The user releases trigger 14, which causes actuator 16 to shift such that mix chamber 64 is driven back to the purge state by actuator 16. Mix chamber 64 fluidly disconnects from the component material flowpaths in fluid cartridge 20, stopping the flow of both the first component material and the second component material into mix chamber 64. In the purge state, purge air flows through mix chamber 64 and out of spray orifice 72 to blow any remaining material out of mix chamber 64. The purge air can continually flow through mix chamber 64 when mix chamber 64 is in the purge state. The purge air prevents curing within mix chamber 64, which can destroy the operability of mix chamber 64.

Plural component sprayer 10 provides significant advantages. Plural component sprayer 10 can be simply and quickly assembled and disassembled. The quick assembly reduces downtime due to part replacement, increasing productivity. Fluid cartridge 20 further facilities quick assembly by providing a single module containing various seals and other components that previously required individual assembly on-site. Fluid cartridge 20 can be disposable and replaced with a new fluid cartridge 20 to resume spray operations. Fluid cartridge 20 provides a single replacement part that also reduces the part count that the user is required to track, simplifying operations and providing easier tracking for the user. Mix chamber assembly 22 is also easily removed and replaced, further reducing downtime and increasing productivity.

Figure 2A:
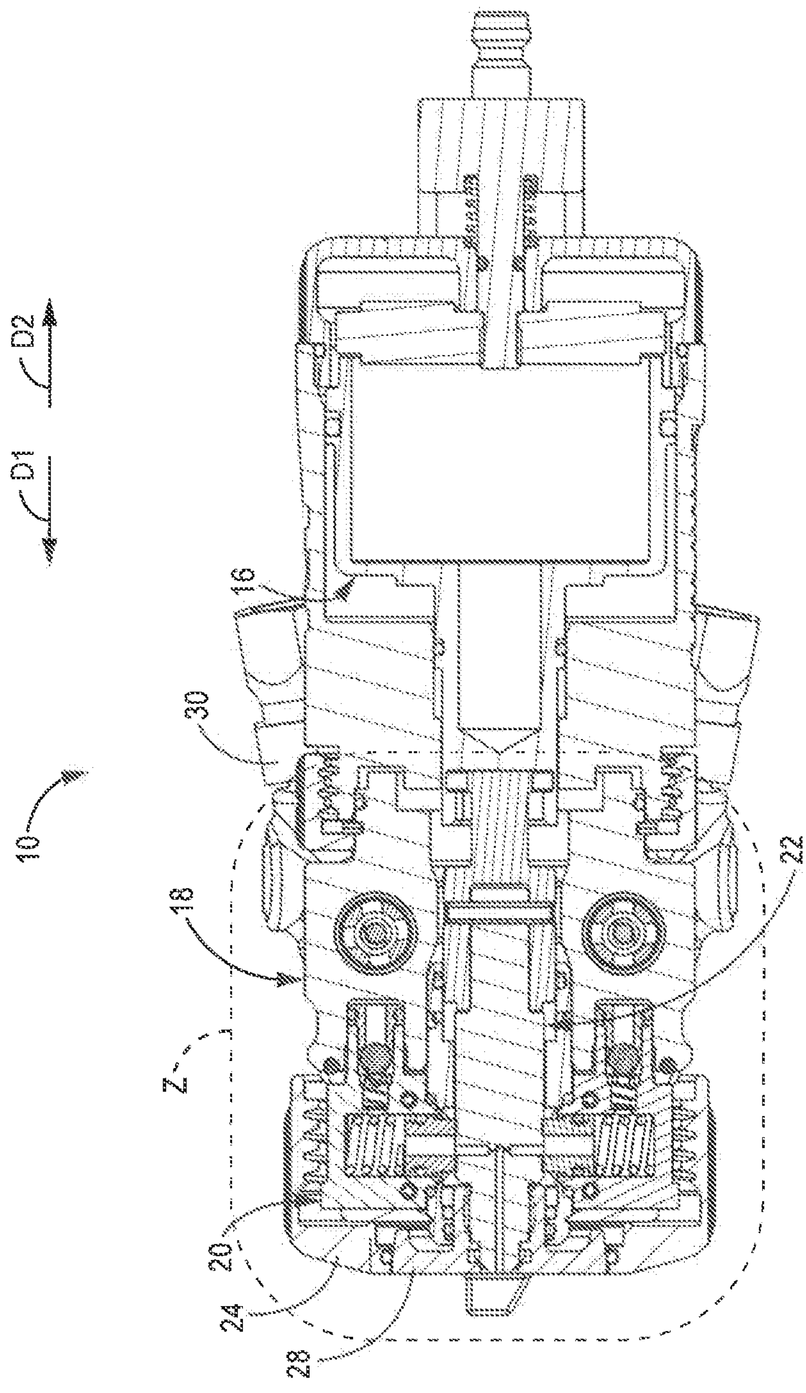
FIG. 2A is a cross-sectional view taken along line 2-2 in FIG. 1A.
Figure 2B:
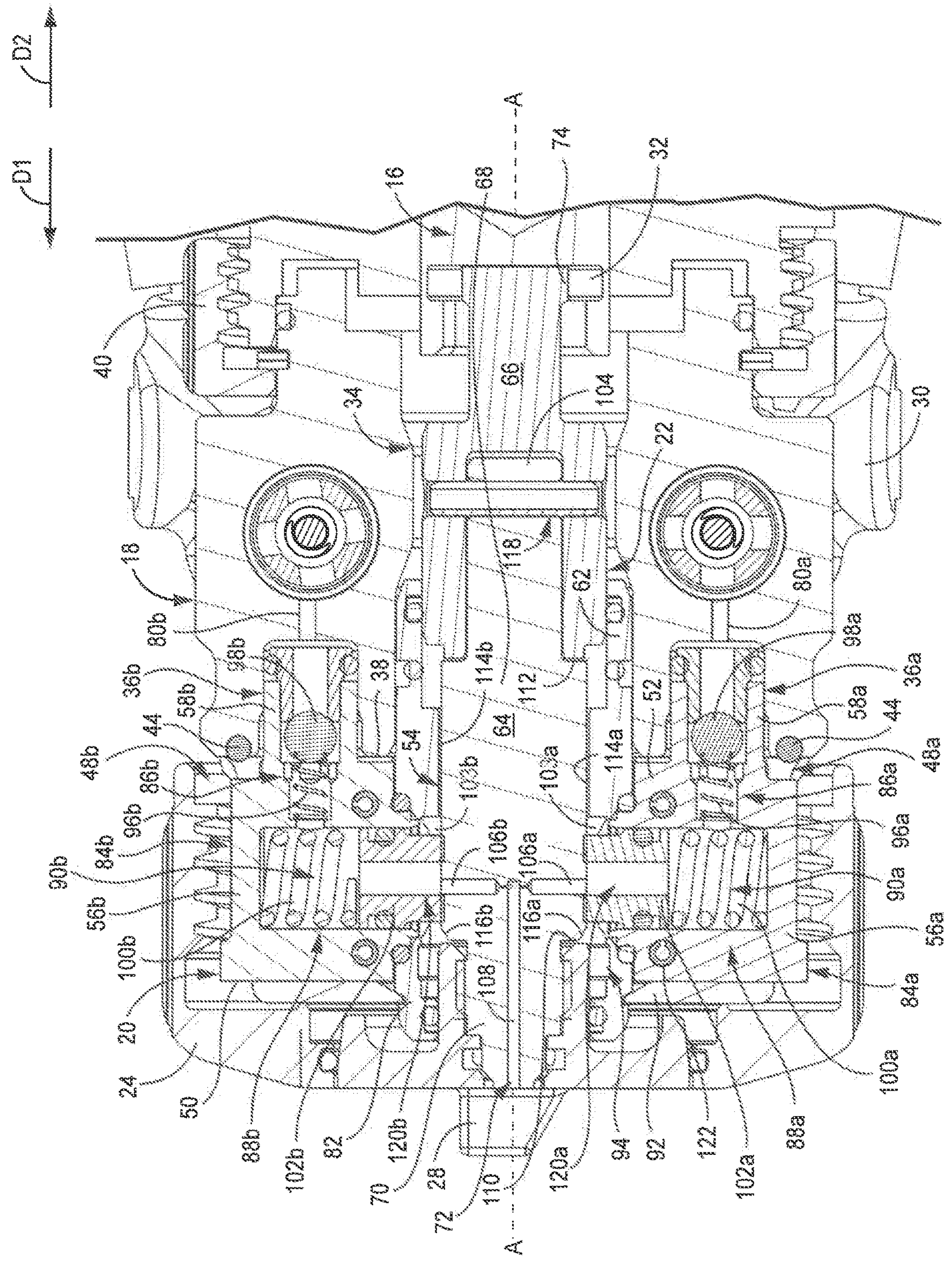
FIG. 2B is an enlarged view of detail Z in FIG. 2A.

FIG. 2A is a cross-sectional view of plural component sprayer 10 taken along line 2-2 in FIG. 1A. FIG. 2B is an enlarged view of detail Z in FIG. 2A. FIGS. 2A and 2B will be discussed together. Actuator 16, mounting head 18, fluid cartridge 20, mix chamber assembly 22, retaining cap 24, air cap 28, and manifold 30. Actuator 16 includes tab lock 32. Central bore 34, material ports 36*a*, 36*b*; chamber wall 38; head connector 40; pins 44; slots 48*a*, 48*b*; and material passages 80*a*, 80*b* of mounting head 18 are shown. First end 50, second end 52, cartridge bore 54, projections 56*a*, 56*b*; fluid posts 58*a*, 58*b*; central extension 62; mixer body 82; seal housings 84*a*, 84*b*; fluid checks 86*a*, 86*b*; side seals 88*a*, 88*b*; material pathways 90*a*, 90*b*; cartridge cover 92; purge chamber 94; and retaining members 103*a*, 103*b* of fluid cartridge 20 are shown. Fluid checks 86*a*, 86*b* include springs 96*a*, 96*b* and balls 98*a*, 98*b*, respectively. Side seals 88*a*, 88*b* include side springs 100*a*, 100*b* and seal members 102*a*, 102*b*, respectively. Seal members 102*a*, 102*b* include seal passages 120*a*, 120*b*, respectively. Mix chamber assembly 22 includes mix chamber 64 and chamber connector 66. Body 68, head 70, spray orifice 72, tail 104, inlet bores 106*a*, 106*b*; and mix bore 108 of mix chamber 64 are shown. Body 68 includes first body end 110, second body end 112, lateral sides 114*a*, 114*b* and ramps 116*a*, 116*b*. Tail 104 includes pin bore 118. Chamber connector 66 includes locking tab 74.

Mounting head 18 is mounted to the body of plural component sprayer 10. Head connector 40 is rotatably disposed on mounting head 18. Head connector 40 secures mounting head 18 to plural component sprayer 10. Material passages 80*a*, 80*b* extend through mounting head 18 and convey the first and second component materials from manifold 30 to material ports 36*a*, 36*b*, respectively. Material ports 36*a*, 36*b* extend into chamber wall 38 of mounting head 18. Central bore 34 extends axially through mounting head 18. Slots 48*a*, 48*b* are formed in receiving portion 42 (FIGS. 1B and 3A-4B) of mounting head 18. Slots 48*a*, 48*b* ensure proper alignment of fluid cartridge 20 during assembly and prevent rotation of fluid cartridge 20 relative to mounting head 18 to assist in maintaining fluid cartridge 20 in the proper position during assembly and operation. Pins 44 are disposed at the closed ends of slots 48*a*, 48*b*.

Fluid cartridge 20 is fluidly connected to mounting head 18 and secured within the receiving portion 42. Retaining cap 24 is attached to mounting head 18 and secures fluid cartridge 20 within the head chamber 46. Seal housings 84*a*, 84*b* are disposed on opposite sides of mixer body 82. Projections 56*a*, 56*b* are formed by portions of seal housings 84*a*, 84*b*. Projections 56*a*, 56*b* are received in slots 48*a*, 48*b*. Cartridge cover 92 extends over portions of seal housings 84*a*, 84*b* and mixer body 82 to secure seal housings 84*a*, 84*b* and mixer body 82 together to form fluid cartridge 20. In some examples, cartridge cover 92 can form a permanent connection such that disassembling fluid cartridge 20 would destroy the operability of one or more parts forming fluid cartridge 20. In some examples, fasteners 122, such as pins or screws, among other options, extend through mixer body 82 and seal housings 84*a*, 84*b* to join mixer body 82 and seal housings 84*a*, 84*b* together. Cartridge cover 92 can cover the openings that fasteners 122 extend through. While fluid cartridge 20 is described as formed from separate seal housings 84*a*, 84*b*; mixer body 82; and cartridge cover 92, it is understood that fluid cartridge 20 can be formed as a unitary part. For example, fluid cartridge 20 can be formed by molding, casting, additive manufacturing, or any other suitable manufacturing process. In addition, the components forming fluid cartridge 20 can be permanently joined in some examples, such that disassembling the components destroys the operability of fluid cartridge 20.

Material pathways 90*a*, 90*b* extend through seal housings 84*a*, 84*b*, respectively. Material pathways 90*a*, 90*b* provide flowpaths for the first and second component materials to flow through fluid cartridge 20 to central bore 34. Fluid checks 86*a*, 86*b* are disposed at the inlet ends of material pathways 90*a*, 90*b*, respectively. Fluid posts 58*a*, 58*b* project from second end 52 of fluid cartridge 20 and are configured to extend into material ports 36*a*, 36*b*, respectively. Fluid checks 86*a*, 86*b* are disposed at the inlet ends of material pathways 90*a*, 90*b* and are, in the example shown, at least partially disposed in fluid posts 58*a*, 58*b*. Balls 98*a*, 98*b* are disposed in material pathways 90*a*, 90*b* and springs 96*a*, 96*b* interface with balls 98*a*, 98*b* to bias balls 98*a*, 98*b* into closed positions. The seats of each fluid check 86*a*, 86*b* is formed by a component attached to fluid posts 58*a*, 58*b*. The seat portion can be attached to fluid posts 58*a*, 58*b* in any desired manner, such as press-fitting or threading, among other options. Fluid checks 86*a*, 86*b* prevent fluid from backflowing out of fluid cartridge 20 into material passages 80*a*, 80*b* of mounting head 18. As such, fluid checks 86*a*, 86*b* ensure that any cross-over cannot flow into and contaminate mounting head 18.

Side seals 88*a*, 88*b* are at least partially disposed in material pathways 90*a*, 90*b*, respectively. Side springs 100*a*, 100*b* are disposed in material pathways 90*a*, 90*b* and bias seal members 102*a*, 102*b* towards axis A-A. Seal members 102*a*, 102*b* include flat faces to engage and seal against the flat lateral sides 114*a*, 114*b* of mix chamber 64. Seal members 102*a*, 102*b* provide the component materials to inlet bores 106*a*, 106*b*. Seal members 102*a*, 102*b* include seal passages 120*a*, 120*b* through which the component materials flow. Side seals 88*a*, 88*b* are pre-loaded, meaning that side springs 100*a*, 100*b* exert force on seal members 102*a*, 102*b* to bias seal members 102*a*, 102*b* into cartridge bore 54 prior to installation of mix chamber assembly 22. Seal members 102*a*, 102*b* project partially out of material pathways 90*a*, 90*b* and into cartridge bore 54. Retaining members 103*a*, 103*b*, such as clips, are disposed in material pathways 90*a*, 90*b* proximate cartridge bore 54 and interface with seal members 102*a*, 102*b* to retain seal members 102*a*, 102*b* in material pathways 90*a*, 90*b* and limit the extent to which seal members 102*a*, 102*b* can project into cartridge bore 54. Seal members 102*a*, 102*b* project into cartridge bore 54 prior to installation of mix chamber assembly 22 to ensure proper engagement and sealing between seal members 102*a*, 102*b* and lateral sides 114*a*, 114*b*.

Central extension 62 is formed by a portion of mixer body 82 that extends beyond second end 52 of fluid cartridge 20. Central extension 62 extends into cartridge bore 54 of mounting head 18. Cartridge bore 54 extends axially through mix chamber 64. Purge chamber 94 is formed in a portion of cartridge bore 54. Mix chamber 64 is disposed in cartridge bore 54 and movable along axis A-A.

Mix chamber assembly 22 is disposed on axis A-A. Mix chamber assembly 22 is attached to actuator 16 to be moved along axis A-A. Mix chamber assembly 22 receives the first and second component materials. The plural component material is formed in mix chamber assembly 22 and sprayed from spray orifice 72 formed in mix chamber 64. Chamber connector 66 is mounted to tail 104 by a pin extending through chamber connector 66 and pin bore 118. It is understood, however, that chamber connector 66 can be attached to mix chamber 64 in any desired manner, such as by interfaced threading, among other options. Locking tab 74 is disposed at an end of chamber connector 66 opposite mix chamber 64. Locking tab 74 is received by tab lock 32 to secure mix chamber assembly 22 to actuator 16.

Cartridge body 68 extends between first body end 110 and second body end 112. Head 70 projects from first body end 110. Air cap 28 is mounted on head 70 and can be attached to head 70 in any desired manner. For example, head 70 and air cap 28 can include interfaced threading, among other options. Tail 104 extends from second body end 112. Pin bore 118 projects through tail 104.

Lateral sides 114*a*, 114*b* extend between first body end 110 and second body end 112. Lateral sides 114*a*, 114*b* form flat axial faces that facilitate sliding engagement between seal members 102*a*, 102*b* and lateral sides 114*a*, 114*b*. Ramps 116*a*, 116*b* form a transition between first end 50 and second end 52. Ramps 116*a*, 116*b* facilitate installation of mix chamber 64, which is inserted into cartridge bore 54 from second end 52 and in direction D1. Ramps 116*a*, 116*b* engage seal members 102*a*, 102*b* and push seal members 102*a*, 102*b* away from axis A-A to widen the gap between seal members 102*a*, 102*b* and allow mix chamber 64 to pass under seal members 102*a*, 102*b* so seal members 102*a*, 102*b* pass onto and engage lateral sides 114*a*, 114*b*. Ramps 116*a*, 116*b* form a transition feature of mix chamber 64 that facilitates installation of mix chamber 64 through pre-loaded side seals 88*a*, 88*b*.

Inlet bores 106*a*, 106*b* extend into lateral sides 114*a*, 114*b*, respectively, and through body 68 to mix bore 108. In some examples, inlet bores 106*a*, 106*b* extend radially through body 68. It is understood, however, that inlet bores 106*a*, 106*b* can be disposed at any desired orientation relative to axis A-A that provide fluid flow paths to mix bore 108. Mix bore 108 extends through mix chamber 64 between inlet bores 106*a*, 106*b* and spray orifice 72. Mix bore 108 receives fluid from inlet bores 106*a*, 106*b* and provides the fluid to spray orifice 72. Mix chamber 64 moves along axis A-A between a first position associated with the spray state, where mix chamber 64 receives the individual component materials from inlet bores 106*a*, 106*b* and provides the resulting plural component material to spray orifice 72, and a second position associated with the purge state, where mix chamber receives purge air from inlet bores 106*a*, 106*b* and provides the purge air to spray orifice 72.

Mix chamber assembly 22, mounting head 18, and fluid cartridge 20 are removable from plural component sprayer 10. During assembly, mix chamber assembly 22 is mounted to actuator 16. Locking tab 74 is inserted into tab lock 32 and rotated to secure locking tab 74 to actuator 16. Mounting head 18 is moved axially in direction D2 such that mix chamber 64 passes through central bore 34. Head connector 40 is secured to gun body.

Fluid cartridge 20 is moved axially in direction D2 and onto mounting head 18. Fluid posts 58*a*, 58*b* extend into and are received by material ports 36*a*, 36*b*, thereby forming fluid and mechanical connections between fluid cartridge 20 and mounting head 18. Central extension 62 extends into and is received by central bore 34. Projections 56*a*, 56*b* are received by slots 48*a*, 48*b*, facilitating proper alignment of fluid cartridge 20 and mounting head 18 as fluid cartridge 20 is shifted into position on mounting head 18.

As fluid cartridge 20 shifts in direction D2, mix chamber 64 passes through cartridge bore 54. Ramps 116*a*, 116*b* are the first portion of mix chamber 64 to contact seal members 102*a*, 102*b*. Ramps 116*a*, 116*b* form a sloped transition feature that pushes seal members 102*a*, 102*b* away from axis A-A, widening the gap between seal members 102*a*, 102*b* as mix chamber 64 passes through cartridge bore 54. Lateral sides 114*a*, 114*b* pass under seal members 102*a*, 102*b* and are sealingly engaged by seal members 102*a*, 102*b*. Seal members 102*a*, 102*b* form sliding seals that maintain engagement with lateral sides 114*a*, 114*b* throughout operation.

Cartridge cover 92 is attached to mounting head 18 to secure fluid cartridge 20 in place on mounting head 18. Air cap 28 is attached to head 70. Manifold 30 is attached to mounting head 18. Plural component sprayer 10 is thus ready for operation. While mounting head 18 and fluid cartridge 20 are described as separately formed components, it is understood that mounting head 18 and fluid cartridge 20 can be permanently attached or unitarily formed such that mounting head 18 and fluid cartridge 20 form a removable mounting and mixing assembly.

Fluid cartridge 20 facilitates quick and easy replacement of fluid sealing components, such as side seals 88*a*, 88*b*, thereby reducing downtime during operation. In addition, fluid cartridge 20 incorporates the fluid sealing components into a single assembly, thereby reducing the number of replacement parts to one, further reducing downtime and increasing productivity. To replace fluid cartridge 20, the user removes air cap 28 and cartridge cover 92. Fluid cartridge 20 is pulled axially in direction D1, removing fluid posts 58*a*, 58*b* from material ports 36*a*, 36*b* and central extension 62 from central bore 34. Mix chamber 64 shifts in direction D2 through cartridge bore 54 and removed from cartridge bore 54. A new fluid cartridge 20 can then be installed as described above. Plural component sprayer 10 is ready to spray.

If a new mix chamber 64 is required, mounting head 18 can be disconnected from gun body and pulled in direction D1 off of mix chamber 64. Manifold 30 can remain connected to mounting head 18 during disassembly. Mix chamber assembly 22 is rotated and pulled in direction D1 to remove locking tab 74 from tab lock 32. A new mix chamber 64 assembly can be attached at tab lock 32 and mounting head 18 and fluid cartridge 20 can be installed as described above. In some examples, the pin can be pulled from pin bore 118, thereby disconnecting chamber connector 66 from mix chamber 64. A new mix chamber 64 can be attached to chamber connector 66 to form a new mix chamber assembly 22. In some examples, the user can swap different mix chamber assemblies 22 having different spray orifice configurations to provide different spray patterns. Mix chamber assembly 22 facilitates easy removal and replacement of the fluid handling components of plural component sprayer 10.

During operation, actuator 16 is driven in direction D1 to stop spraying of the plural component material and in direction D2 to initiate spraying of the plural component material. It is understood, however, that plural component sprayer 10 can be configured such that actuator 16 is driven in direction D1 to initiate spraying and in direction D2 to stop spraying. For example, mix chamber 64 can be configured such that inlet bores 106*a*, 106*b* are disposed on an opposite side of seal members 102*a*, 102*b* from spray orifice 72 with mix chamber 64 in the purge state.

Actuator 16 and mix chamber assembly 22 are shown in the spray state in FIGS. 2A and 2B. Initially, mix chamber assembly 22 is in a first position, where inlet bores 106*a*, 106*b* are shifted in direction D1 relative to seal members 102*a*, 102*b* such that inlet bores 106*a*, 106*b* are forward of seal members 102*a*, 102*b* and fluidly isolated from material pathways 90*a*, 90*b* by seal members 102*a*, 102*b*. In the first position, inlet bores 106*a*, 106*b* are positioned in purge chamber 94 to receive purge air, as discussed further below with regard to FIGS. 3A and 3B. The purge air flows through inlet bores 106*a*, 106*b* and mix bore 108 and out of spray orifice 72. In some examples, the purge air continuously flows to purge chamber 94 and thus through mix chamber 64 when mix chamber 64 is in the purge state. The purge air blows any component material that remains in mix chamber 64 out of mix chamber 64 through spray orifice 72, preventing curing in mix chamber 64 and maintaining the operability of mix chamber 64.

The first component material enters mounting head 18 and flows through material passage 80*a* to material port 36*a*. The upstream pressure of the first component material opens fluid check 86*a* and drives the first component material through fluid check 86*a*. The first component material flows through material pathway 90*a* and seal member 102*a* and deadheads against lateral side 114*a*. The upstream pressure pushes seal member 102*a* into engagement with lateral side 114*a*, enhancing the seal formed therebetween. In the example shown, seal member 102*a* forms an annular seal on lateral side 114*a*. Side seal 88*a* further wipes lateral side 114*a* as mix chamber 64 shifts positions to prevent any first component material residue from residing on lateral side 114*a*, which material could cure on lateral side 114*a* and damage seal member 102*a*.

The second component material enters mounting head 18 and flows through material passage 80*b* to material port 36*b*. The upstream pressure of the second component material opens fluid check 86*b* and drives the second component material through fluid check 86*b*. The second component material flows through material pathway 90*b* and seal member 102*b* and deadheads against lateral side 114*b*. The upstream pressure further pushes seal member 102*b* into engagement with lateral side 114*b*, enhancing the seal formed therebetween. In the example shown, seal member 102*b* forms an annular seal on lateral side 114*b*. Side seal 88*b* wipes lateral side 114*b* as mix chamber 64 shifts positions to prevent any second component material residue from residing on lateral side 114*b*, which material could cure on lateral side 114*b* and damage seal member 102*b*.

To initiate spraying, actuator 16 is driven in direction D2. Actuator 16 pulls mix chamber assembly 22 in direction D2 and into the spray state. Inlet bores 106*a*, 106*b* pass under seal members 102*a*, 102*b* and into fluid communication with material pathways 90*a*, 90*b*. The upstream pressure in material pathway 90*a* drives the first component material through inlet bore 106*a* to mix bore 108. The upstream pressure in material pathway 90*b* drives the second component material through inlet bore 106*b* to mix bore 108. The first and second component materials combine in mix bore 108 to form the plural component material. The plural component material is ejected as a spray through spray orifice 72.

To stop spraying, actuator 16 is driven in direction D. Actuator 16 pushes mix chamber assembly 22 in direction D1 and into the purge state. Inlet bores 106*a*, 106*b* pass under seal members 102*a*, 102*b* and out of fluid communication with material pathways 90*a*, 90*b*. The purge air flows through inlet bores 106*a*, 106*b* and mix bore 108 and blows the material remaining in inlet bores 106*a*, 106*b* and mix bore 108 out of spray orifice 72.

In some cases, the first or second component material can cross-over into the opposite material passage 80*a*, 80*b*, causing curing at that location. For example, such cross-over can occur when the upstream pressures of the first and second component materials are imbalanced. Fluid checks 86*a*, 86*b* prevent any such cross-over from exiting fluid cartridge 20. As such, the cross-over and contamination is contained within fluid cartridge 20. Fluid checks 86*a*, 86*b* prevent mounting head 18 from being contaminated in the event of cross-over. As discussed above, fluid cartridge 20 can be easily removed and a new fluid cartridge 20 installed to return plural component sprayer 10 to operation.

Plural component sprayer 10 provides significant advantages. Fluid cartridge 20 facilitates quick and easy replacement of the fluid handling components that can be contaminated by cross-over. Fluid cartridge 20 provides a single replacement part, reducing the user's part count and inventory, reducing downtime, and increasing operational efficiency. Mix chamber 64 facilities installation through the pre-loaded side seals 88*a*, 88*b* within fluid cartridge 20. Mix chamber assembly 22 can easily be attached to and detached from actuator 16, facilitating quick replacement, reducing downtime, and increasing operational efficiency.

Figure 3A:
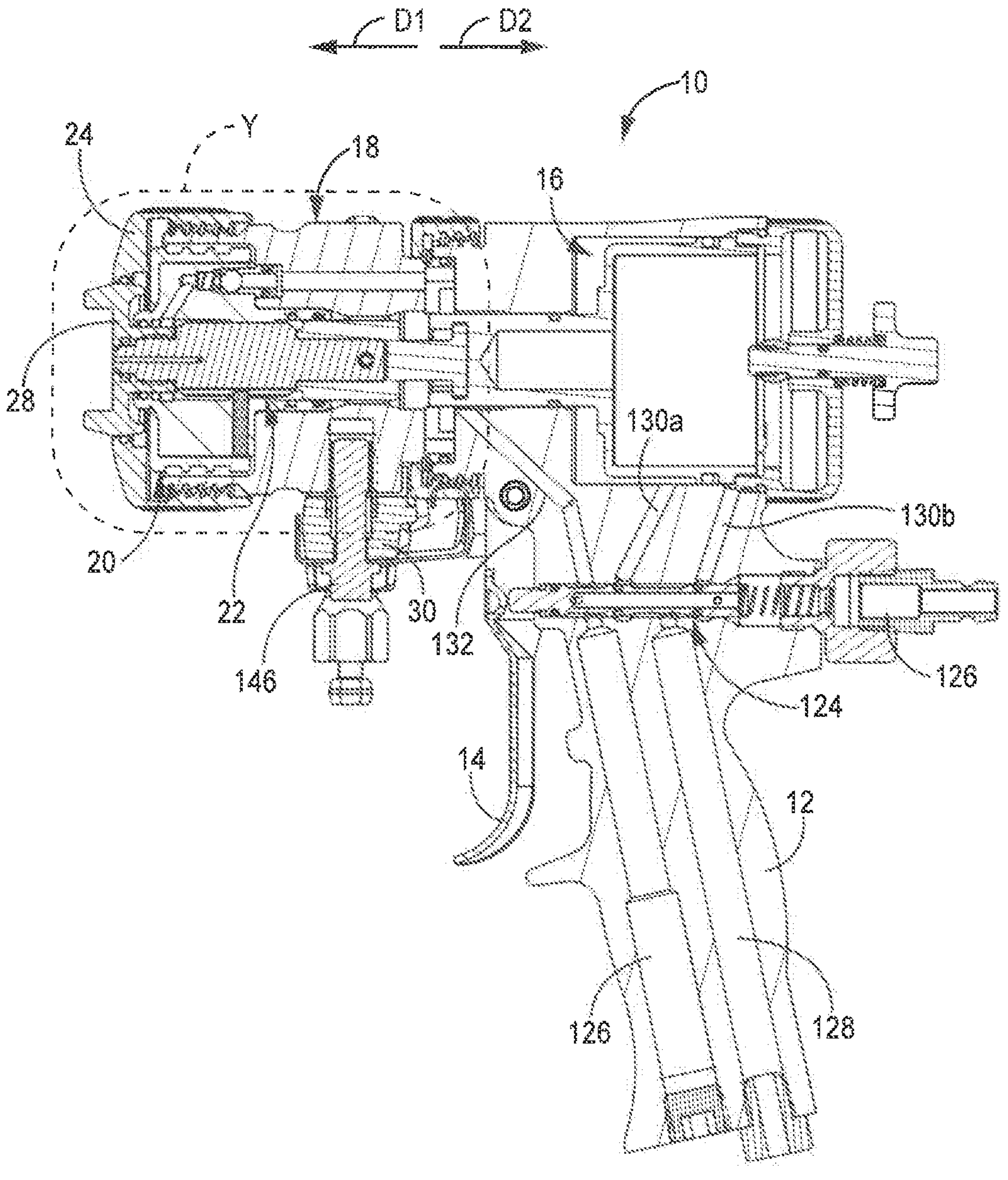
FIG. 3A is a cross-sectional view taken along line 3-3 in FIG. 1A.
Figure 3B:
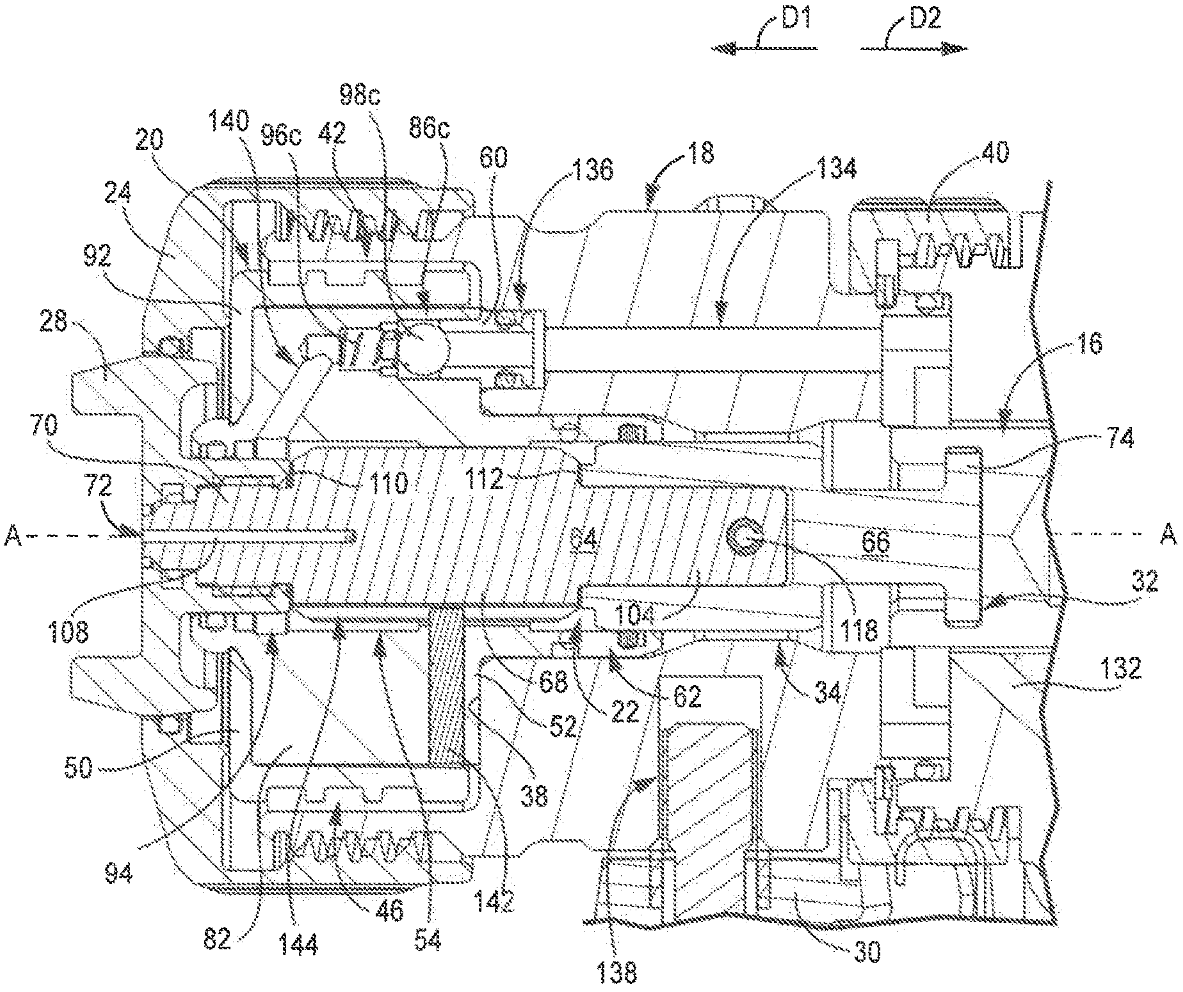
FIG. 3B is an enlarged view of detail Y in FIG. 3A.

FIG. 3A is a cross-sectional view of plural component sprayer 10 taken along line 3-3 in FIG. 1A. FIG. 3B is an enlarged view of detail Y in FIG. 3A. FIGS. 3A and 3B will be discussed together. Plural component sprayer 10 includes handle 12; trigger 14; actuator 16; mounting head 18; fluid cartridge 20; mix chamber assembly 22; retaining cap 24; air cap 28; manifold 30; control valve 124 (FIG. 3A); air inlets 126 (FIG. 3A); air exhaust 128 (FIG. 3A); control paths 130*a*, 130*b* (FIG. 3A); and purge air path 132. Actuator 16 includes tab lock 32. Central bore 34, head connector 40, chamber wall 38, receiving portion 42, purge bore 134, purge port 136, and fastener bore 138 of mounting head 18 are shown. Receiving portion 42 defines head chamber 46. First end 50, second end 52, cartridge bore 54, purge post 60, central extension 62, mixer body 82, fluid check 86*c*, cartridge cover 92, purge chamber 94, purge path 140, and locating pin 142 of fluid cartridge 20 are shown. Fluid check 86*c* includes spring 96*c* and ball 98*c*. Mix chamber assembly 22 includes mix chamber 64 and chamber connector 66. Body 68, head 70, spray orifice 72, tail 104, and mix bore 108 of mix chamber 64 are shown. Body 68 includes first body end 110, second body end 112, and slot 144. Tail 104 includes pin bore 118. Chamber connector 66 includes locking tab 74.

Air inlets 126 extend into plural component sprayer 10 and are configured to receive an air supply line (not shown) extending from a pressurized air source (not shown), such as an air compressor or an air tank. Air inlets 126 provide pathways for the compressed air to enter plural component sprayer 10. The multiple air inlets 126 provide alternative connecting points for the air supply line. The air inlet 126 not in use can be plugged. Air inlets 126 extend to control valve 124. Air exhaust 128 extends from control valve 124 through handle 12. Air exhaust 128 provides a pathway for compressed air to exhaust from plural component sprayer 10.

Actuator 16 is disposed in plural component sprayer 10 and is configured to actuate mix chamber 64 between the spray state, where mix chamber 64 is positioned to receive the first and second component materials and eject the plural component material from spray orifice 72, and the purge state, where mix chamber 64 is fluidly disconnected from the first and second component materials and is instead positioned receive purge air from purge chamber 94. In the example shown, actuator 16 is a pneumatic piston.

Control valve 124 is disposed in plural component sprayer 10 and controls the flow of air through control paths 130*a*, 130*b* to and from actuator 16. Trigger 14 is pivotably connected to plural component sprayer 10 and actuates control valve 124 between a first position, where control valve 124 directs compressed air from an air inlet 126 to actuator 16 via control path 130*a* and directs spent compressed air from actuator 16 to air exhaust 128 via control path 130*b*, and a second position, where control valve 124 directs compressed air from an air inlet 126 to actuator 16 via control path 130*b* and directs spent compressed air from actuator 16 to air exhaust 128 via control path 130*a*. Directing the compressed air via control path 130*a* drives actuator 16, and thus mix chamber assembly 22, in direction D2 to place mix chamber assembly 22 in the spray state such that mix chamber 64 receives the first and second component fluids. Directing the compressed air via control path 130*b* drives actuator 16, and thus mix chamber assembly 22, in direction D1 to fluidly disconnect mix chamber assembly 22 from the first and second component fluid flows and place mix chamber assembly 22 in the purge state.

Purge air path 132 extends from control valve 124 to purge port 136 in mounting head 18. Purge air path 132 is continuously connected to the flow of compressed air entering plural component sprayer 10 via air inlet 126. The purge air is a portion of the compressed air provided via air inlet 126 that flows through purge air path 132 to mounting head 18.

Mounting head 18 is mounted to plural component sprayer 10. Head connector 40 secures mounting head 18 to gun body. In the example shown, head connector 40 and plural component sprayer 10 include interfaced threading. Manifold 30 is mounted to mounting head 18 to provide the first and second component materials to mounting head 18. In the example shown, manifold fastener 146 extends into fastener bore 138 formed in mounting head 18. It is understood, however, that manifold 30 can be mounted to mounting head 18 in any desired manner.

Receiving portion 42 extends from an opposite end of mounting head 18 from head connector 40. Head chamber 46 is defined by receiving portion 42 and is configured to receive fluid cartridge 20. Purge bore 134 extends through mounting head 18 to purge port 136. Purge port 136 extends into chamber wall 38. Purge bore 134 receives purge air from purge air path 132. Purge bore 134 provides the purge air to fluid cartridge 20 at purge bore 134.

Fluid cartridge 20 is disposed in head chamber 46. Central extension 62 extends along axis A-A and projects beyond second end 52 of fluid cartridge 20. Central extension 62 is formed by a part of mixer body 82 extending beyond second end 52. Central extension 62 extends into central bore 34 of mounting head 18. Cartridge bore 54 extends through fluid cartridge 20 from first end 50 through central extension 62. Cartridge bore 54 receives mix chamber 64. Mix chamber 64 can shift axially along axis A-A within cartridge bore 54. Slot 144 is formed in a bottom of body 68. Slot 144 extends along axis A-A between first body end 110 and second body end 112. Locating pin 142 is mounted to mixer body 82 and extends into cartridge bore 54. Locating pin 142 is disposed within and slides along slot 144 as mix chamber 64 shifts between the spray and purge states. Locating pin 142 interfacing with slot 144 ensures proper installation and alignment of mix chamber 64. Locating pin 142 and slot 144 ensure that the correct mix chamber 64 is installed, as locating pin 142 will prevent incorrectly configured mix chambers 64 from passing through cartridge bore 54. In addition, locating pin 142 and slot 144 provide mistake-proofing by preventing mix chamber 64 from being installed inverted. While locating pin 142 is shown as separately formed from body 68, it is understood that locating pin 142 and body 68 can be formed as a unitary part, in some examples. While fluid cartridge 20 is shown as including locating pin 142, it is understood that fluid cartridge 20 can include a projection of any desired type suitable for interfacing with slot 144. For example, locating pin 142 can be formed as a rail or other elongate projection or as a series of discrete projections.

Purge post 60 projects from second end 52. Purge post 60 extends into purge bore 134 of mounting head 18. Fluid check 86*c* is disposed in fluid cartridge 20 and retained within fluid cartridge 20 by purge post 60. In the example shown, a portion of purge post 60 forms the seat for ball 98 of fluid check 86*c*. Spring 96 biases ball 98 into a closed position such that ball 98 is normally seated in a closed position.

Purge path 140 extends through fluid cartridge 20 from purge post 60 to cartridge bore 54. Purge path 140 is configured to provide purge air to purge chamber 94 of cartridge bore 54. Fluid check 86*c* allows purge air to enter purge path 140 while preventing backflow of either air or material into mounting head 18 from purge path 140. For example, if cross-over or other leakage of the component materials occurs, the component materials could flow into purge path 140. Fluid check 86*c* prevents the material from backflowing into purge bore 134 from fluid cartridge 20. As such, fluid check 86*c* keeps the air paths within mounting head 18 and plural component sprayer 10 free from material contamination. If such contamination does occur in fluid cartridge 20, the contamination is limited to fluid cartridge 20 such that the user only need replace fluid cartridge 20, not mounting head 18 or other upstream components, to return plural component sprayer 10 to operation. While fluid check 86*c* is shown as a ball check valve, it is understood that fluid check 86*c* can be of any desired configuration suitable for ensuring one-way flow through purge post 60.

Mix chamber assembly 22 is operatively connected to actuator 16. Chamber connector 66 is disposed on and connected to tail 104 of mix chamber 64. Locking tab 74 projects from an end of chamber connector 66 opposite mix chamber 64. Locking tab 74 is disposed in tab lock 34 of actuator 16.

During operation, control valve 124 is initially positioned to direct compressed air via control path 130*b*. The compressed air flows to the chamber housing actuator 16 and pushes actuator 16 in direction D1. Actuator 16 pushes mix chamber assembly 22 in direction D1 and into the purge state. The purge air portion of the compressed air flows from control valve 124 through purge air path 132 in plural component sprayer 10 and through purge bore 134 in mounting head 18. The purge air has sufficient pressure to open fluid check 86*c*. The purge air flows through purge path 140 and to purge chamber 94. With mix chamber assembly 22 in the purge state, inlet bores 106*a*, 106*b* (best seen in FIGS. 2A and 2B) are fluidly connected to purge chamber 94. The purge air enters mix chamber 64 through inlet bores 106*a*, 106*b* and flows through mix bore 108 to spray orifice 72. The purge air carries any component material or residue in mix chamber 64 out through spray orifice 72, preventing undesired curing within mix chamber 64.

To initiate spraying, the user actuates trigger 14, which actuates control valve 124 such that control valve 124 fluidly connects air inlet 126 with control path 130*a* and fluidly connects control path 130*b* with air exhaust. The portion of compressed air that biased actuator 16 in direction D1 is exhausted through control path 130*b* and air exhaust 128. Another portion of compressed air is provided to actuator 16 via control path 130*a*. That portion of compressed air drives actuator 16 in direction D2. Actuator 16 pulls mix chamber 64 to the spray state. Mix chamber 64 receives the first and second component materials and emits a spray of the plural component material from spray orifice 72. The purge air continues to flow to purge chamber but is prevented from entering mix chamber by seal members 102*a*, 102*b* (FIGS. 2A and 2B).

The user releases trigger 14 and control valve 124 returns to the initial position. Compressed air drives actuator 16 in direction D1 and actuator 16 pushes mix chamber 64 to the purge state. The purge air clears any remaining material from mix bore 108.

Fluid cartridge 20 provides significant advantages. Fluid cartridge 20 facilitates quick and easy replacement of the fluid handling components that can be contaminated by cross-over. Fluid cartridge 20 provides a single replacement part, reducing the user's part count and inventory, reducing downtime, and increasing operational efficiency. Fluid check 86*c* allows purge air to enter fluid cartridge 20 but prevents any upstream flow out of purge path 140 to mounting head 18. As such, any contamination that may occur in fluid cartridge 20 is confined to fluid cartridge 20. The air paths upstream of fluid check 86*c* are protected from contamination.

Figure 4A:
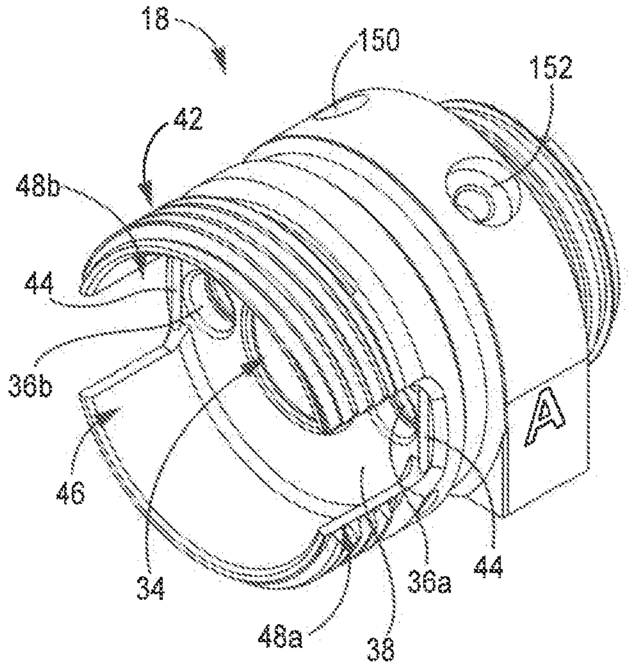
FIG. 4A is a front isometric view of a mounting head.
Figure 4B:
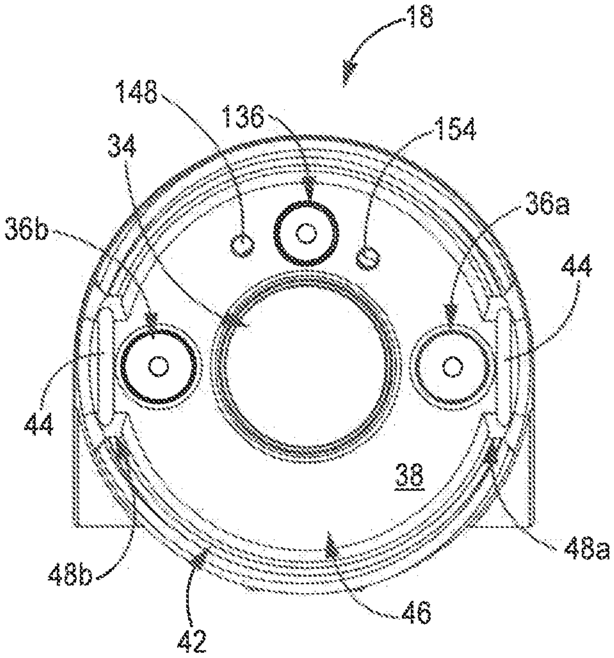
FIG. 4B is a front elevation view of the mounting head shown in FIG. 4A.
Figure 4C:
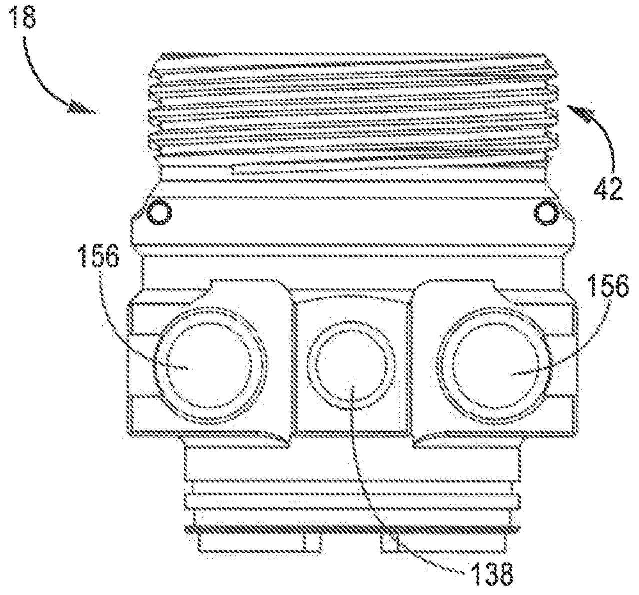
FIG. 4C is a bottom plan view of the mounting head shown in FIG. 4A.

FIG. 4A is a front isometric view of mounting head 18. FIG. 4B is a front elevation view of mounting head 18. FIG. 4C is a bottom plan view of mounting head 18. FIGS. 4A-4C will be discussed together. Mounting head 18 includes central bore 34 (FIGS. 4A and 4B), material ports 36*a*, 36*b* (FIGS. 4A and 4B); chamber wall 38 (FIGS. 4A and 4B), receiving portion 42, pins 44 (FIGS. 4A and 4B), purge port 136 (FIG. 4B), fastener bore 138 (FIG. 4C), clean-off air port 148 (FIG. 4B), clean-off control port 150 (FIG. 4A), grease inlet 152 (FIG. 4A), grease outlet 154 (FIG. 4B), and inlet ports 156 (FIG. 4C). Receiving portion 42 defines head chamber 46 (FIGS. 4A and 4B) and includes slots 48*a*, 48*b* (FIGS. 4A and 4B).

Mounting head 18 connects to plural component sprayer (best seen in FIGS. 1A, 1B, 2A, and 3A) and receives the first and second component materials from manifold 30 (best seen in FIG. 1B). A connector, such as head connector 40 (FIGS. 1A-3B), is connected to an end of mounting head 18 opposite receiving portion 42. Receiving portion 42 projects from mounting head 18 and is configured to receive fluid cartridge 20 (best seen in FIGS. 2B, 3B, 5A, and 5B). Chamber wall 38 defines the end of receiving portion 42. Receiving portion 42 includes external threading to receive a cover, such as retaining cap 24 (FIGS. 1A-3B), to secure fluid cartridge 20 within receiving portion 42. Central bore 34 extends axially through mounting head 18. Central bore 34 provides a passage through which a mix chamber assembly, such as mix chamber assembly 22 (FIGS. 1B-3B), can extend.

Slots 48*a*, 48*b* extend axially into receiving portion 42 towards the body of mounting head 18. It is understood, however, that slots 48*a*, 48*b* can be disposed at any desired location on receiving portion 42. Slots 48*a*, 48*b* are configured to receive projections 56*a*, 56*b* (best seen in FIGS. 1B, 5A, and 5B) of fluid cartridge 20 to ensure proper alignment of fluid cartridge 20 in receiving portion 42 during assembly and to prevent fluid cartridge 20 from rotating relative to mounting head 18. Pins 44 are disposed at the closed ends of slots 48*a*, 48*b* proximate the body of mounting head 18. Pins 44 are formed from a resilient material, such as hardened steel, and provide braces against which a user can brace a lever arm, such as a screwdriver, to facilitate removal of fluid cartridge 20 from mounting head 18.

Grease inlet 152 extends into mounting head 18. Grease inlet 152 provides a port through which a user can supply grease to components of plural component sprayer 10. The grease flows through mounting head 18 from grease inlet

152 to grease outlet 154. Clean-off air port 148 extends into chamber wall 38. Clean-off air port 148 is configured to provide clean off air to an air cap, such as air cap 28 (FIGS. 1A-3B). The clean off air exits fluid head at clean-off air port 148 and flows through fluid cartridge 20 to air cap 28. A control valve, such as a needle valve, can be mounted to mounting head 18 at clean-off control port 150 to control the flow of clean off air through mounting head 18. Air cap 28 includes internal passages configured to eject the clean-off air proximate the spray orifice of the mix chamber.

Fastener bore 138 extends into a bottom of mounting head 18. Fastener bore 138 is configured to receive a fastener, such as a bolt, to secure manifold 30 to mounting head 18. Inlet ports 156 extend into a bottom of mounting head 18 and are configured to receive the individual component materials from manifold 30. Material ports 36*a*, 36*b* extend into chamber wall 38 of mounting head 18. Each material ports 36*a*, 36*b* is fluidly connected to one of inlet ports 156. Material ports 36*a*, 36*b* are configured to receive fluid posts projecting from fluid cartridge 20. Material ports 36*a*, 36*b* provide the component materials to fluid cartridge 20. Purge port 136 extends into chamber wall 38. Purge port 136 is configured to receive a purge post projection from fluid cartridge 20 to provide purge air to fluid cartridge 20.

Mounting head 18 facilitates quick and simple assembly and disassembly of plural component sprayer 10. Mounting head 18 can be connected and disconnected from plural component sprayer 10 via the connector. In some examples, mounting head 18 facilitates retrofitting of existing plural component sprayers. For example, previous components can be removed and mounting head 18 can be connected to the gun body of the prior sprayer. Mounting head 18 provides the necessary flowpaths to provide component materials, air, and grease to the fluid handling components, such as fluid cartridge 20 and mix chamber 64, of plural component sprayer 10.

Figure 5A:
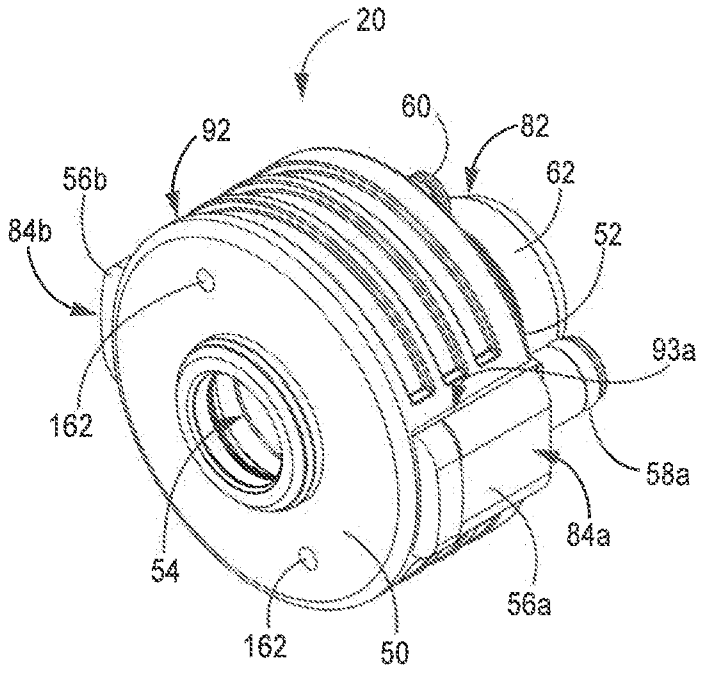
FIG. 5A is a first isometric view of a fluid cartridge.
Figure 5B:
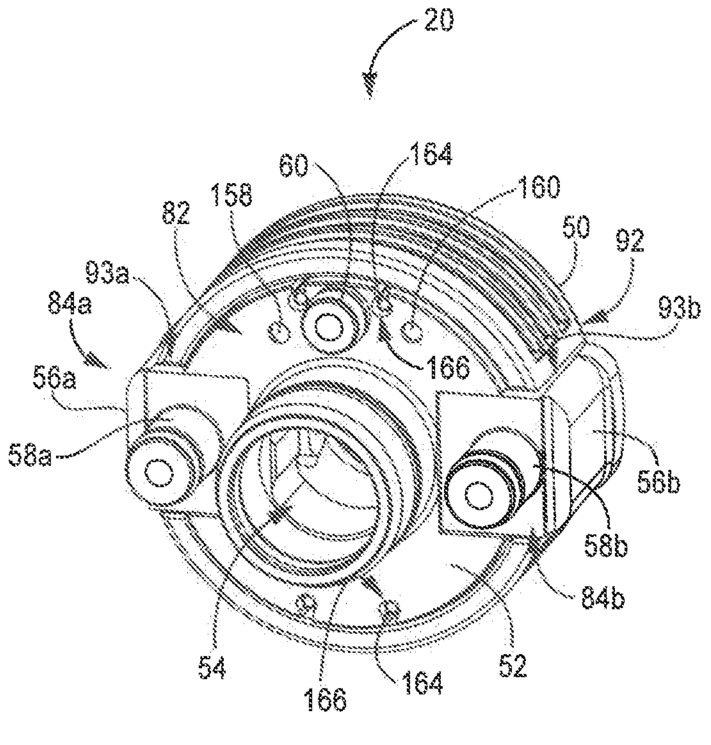
FIG. 5B is a second isometric view of the fluid cartridge shown in FIG. 5A.

FIG. 5A is a first isometric view of fluid cartridge 20. FIG. 5B is a second isometric view of fluid cartridge 20. FIGS. 5A and 5B will be discussed together. Fluid cartridge 20 includes first end 50; second end 52; cartridge bore 54; projections 56*a*, 56*b*; fluid posts 58*a*, 58*b*; purge post 60; central extension 62; mixer body 82; seal housings 84*a*, 84*b*; cartridge cover 92; grease port 158; clean-off inlet 160; and clean-off outlets 162. Cartridge cover 92 includes cover slots 93*a*, 93*b*.

Seal housings 84*a*, 84*b* are disposed on opposite sides of mixer body 82. Central extension 62 is formed by a portion of mixer body 82 extending beyond second end 52. Cartridge bore 54 extends axially through fluid cartridge 20 from first end 50 and through central extension 62. Central extension 62 extends into central bore 34 (FIGS. 1B-4B) of mounting head 18 (best seen in FIGS. 4A-4C). Central bore 34 receives a mix chamber, such as mix chamber 64 (best seen in FIGS. 6A-6D), mix chamber 64' (FIGS. 7A and 7B), mix chamber 64" (FIGS. 8A and 8B), mix chamber 64'" (FIGS. 9A and 9B), and mix chamber 64"" (FIGS. 10A and 10B). Side seals 88*a*, 88*b* (FIGS. 2A and 2B) disposed within seal housings 84*a*, 84*b* are preloaded and seal members 102*a*, 102*b* (FIGS. 2A and 2B) of the side seals 88*a*, 88*b* project into central bore 34 from seal housings 84*a*, 84*b*.

Fluid posts 58*a*, 58*b* extend from seal housings 84*a*, 84*b*, respectively. Fluid posts 58*a*, 58*b* project from second end 52 of fluid cartridge 20. In the example shown, fluid posts 58*a*, 58*b* project from seal housings 84*a*, 84*b*. Fluid posts 58*a*, 58*b* are configured to extend into material ports 36*a*, 36*b* (best seen in FIG. 2B) of mounting head 18. Fluid post 58*a* receives a first component material and fluid post 58*b* receives a second component material from mounting head 18. As discussed above, check valves are disposed in fluid cartridge 20 proximate fluid posts 58*a*, 58*b* to prevent material from backflowing out of fluid posts 58*a*, 58*b*. Flowpaths extend through fluid cartridge 20 from fluid posts 58*a*, 58*b* to cartridge bore 54 to provide the first and second component materials to the mix chamber disposed in cartridge bore 54. Fluid posts 58*a*, 58*b* are disposed on opposite sides of central extension 62. It is understood, however, that fluid posts 58*a*, 58*b* can be disposed at any desired location corresponding to the locations of material ports 36*a*, 36*b*.

Projections 56*a*, 56*b* are formed by seal housings 84*a*, 84*b*, respectively. Cartridge cover 92 includes cover slots 93*a*, 93*b* that extend around projections 56*a*, 56*b*. Projections 56*a*, 56*b* are configured to extend into slots 48*a*, 48*b* (best seen in FIGS. 4A and 4B) of mounting head 18. Projections 56*a*, 56*b* provide a grip point for the user to manipulate fluid cartridge 20, ensure proper alignment of fluid cartridge 20 during installation, and prevent rotation of fluid cartridge 20 relative to mounting head 18.

Purge post 60 extends from second end 52 of fluid cartridge 20. Purge post 60 is configured to extend into purge port 136 (FIGS. 3B and 4B) of mounting head 18. Purge post 60 receives purge air from mounting head 18. An internal flowpath through fluid cartridge 20 provides the purge air to cartridge bore 54. As discussed above, a check valve is disposed in fluid cartridge 20 proximate purge post 60. The check valve prevents fluid from backflowing through purge post 60.

Grease port 158 extends into second end 52 of fluid cartridge 20. A flowpath extends from grease port 158 through mixer to cartridge bore 54 to provide grease to cartridge bore 54. Clean-off inlet 160 extends into second end of fluid cartridge 20. Clean-off outlets 162 extend into first end 50 of fluid cartridge 20. In the example shown, clean-off outlets 162 extend through cartridge cover 92. Flowpaths extends through mixer body 82 to provide clean off air from clean-off inlet 160 to clean-off outlets 162.

Cartridge cover 92 extends over mixer body 82 and portions of seal housings 84*a*, 84*b*. Cartridge cover 92 provides a uniform exterior surface to facilitate user manipulation of fluid cartridge 20. In some examples, cartridge cover 92 holds seal housings 84*a*, 84*b* and mixer body 82 together to form fluid cartridge 20. Cartridge cover 92 covers and protects mixer body 82 and seal housings 84*a*, 84*b* from impact damage. Cartridge cover 92 can include rearwardly extending posts 164 configured to fit within grooves 166 formed in mixer body 82. Posts 164 reside in grooves 166 to lock cartridge cover 92 to mixer body 82 ensure proper alignment during assembly of fluid cartridge 20.

In the example shown, cartridge cover 92 includes exterior grooves configured to facilitate gripping of fluid cartridge 20 by the user. While cartridge cover 92 is shown as including grooves, it is understood that cartridge cover 92 can include features of any desired configuration suitable for enhancing gripping of fluid cartridge 20 by the user. For example, cartridge cover 92 can include a grooved, knurled, textured, or an otherwise non-smooth surface.

Fluid cartridge 20 incorporates approximately fifteen parts of prior plural component heads into one cartridge, which results in quicker head changes compared to the prior plural component heads used to apply binary compounds, like epoxy, which required that the point where the two components combine be cleaned or replaced regularly in order to operate. Fluid cartridge 20 thereby provides a single replaceable cartridge incorporating all replacement parts. In many embodiments, metal and/or plastic seal housings 84*a*, 84*b* contain side seals, side seal o-rings, springs, check valves designed in a way for easy removal and replacement to minimize down time. Fluid cartridge 20 may be disposable to minimize servicing time and for easy preventive maintenance. Fluid cartridge 20 thereby facilitates quick and easy replacement of parts that typically require service in plural component sprayers.

Fluid cartridge 20 provides significant advantages. As discussed above, the first and second component materials are mixed to form the plural component material in the mix chamber disposed in central bore 34. If cross-over occurs, the plural component material can be formed within the sealing components and passageways within fluid cartridge 20, causing those components to seize. In the event of such cross-over, fluid cartridge 20 can be removed from plural component sprayer 10 and replaced with a new fluid cartridge 20, thereby replacing all of those seized components. In addition, the check valves at fluid posts 58*a*, 58*b* and purge post 60 prevent any cross-over from flowing upstream from fluid cartridge 20 into mounting head 18. As such, fluid cartridge 20 prevents contamination of mounting head 18. As such, fluid cartridge 20 provides a single replacement part that can be quickly replaced with a new fluid cartridge 20. This reduces downtime, increases the efficiency of the spray process, and eliminates the need of the user to track multiple small replacement parts. Seal housings 84*a*, 84*b* also contain most or all sealing elements in a pre-assembled fluid cartridge 20. This prevents the user from having to track multiple small parts during repair and replacement. Fluid cartridge 20 also facilitates mounting of different mix chambers having different configurations, providing modularity to plural component sprayer 10 (best seen in FIGS. 1A and 1B).

Figure 6A:
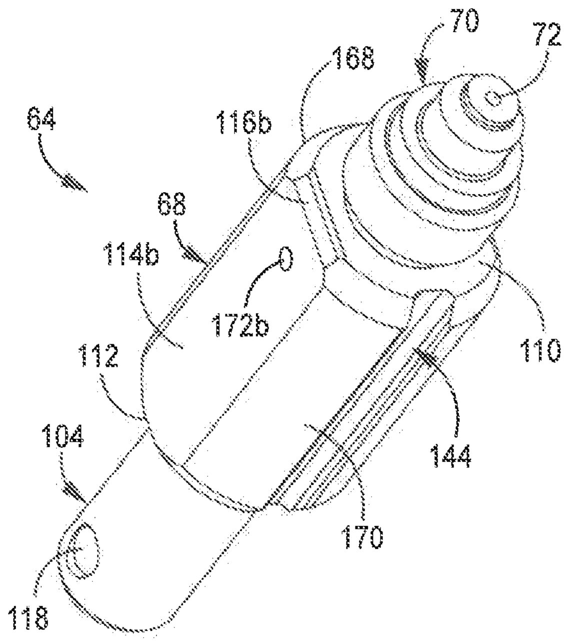
FIG. 6A is an isometric view of a mix chamber.
Figure 6B:
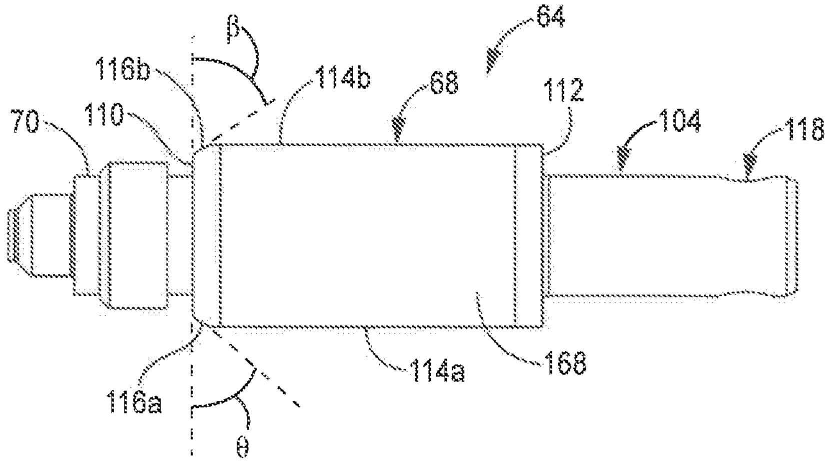
FIG. 6B is a first plan view of the mix chamber shown in FIG. 6A.
Figure 6C:
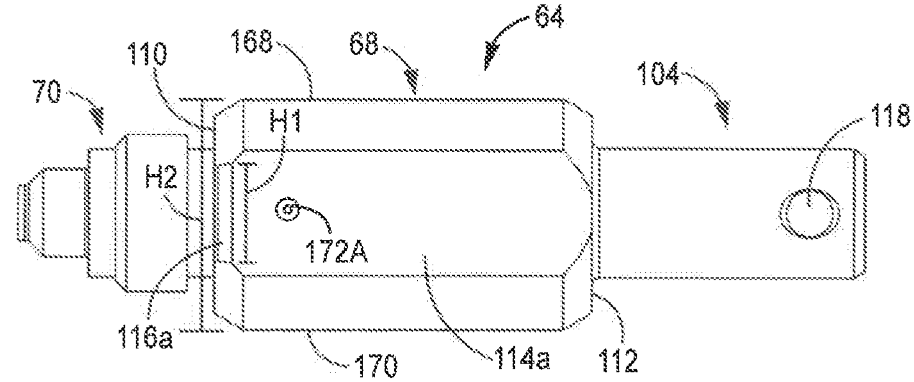
FIG. 6C is a first side elevation view of the mix chamber shown in FIG. 6A.
Figure 6D:
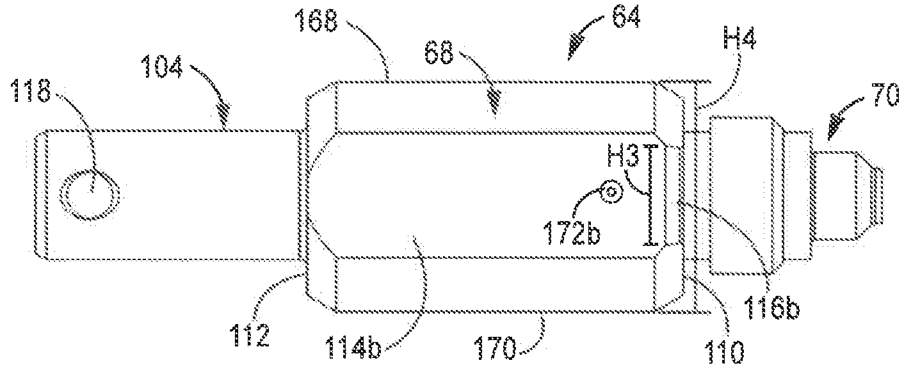
FIG. 6D is a second side elevation view of the mix chamber shown in FIG. 6A.
Figure 6E:
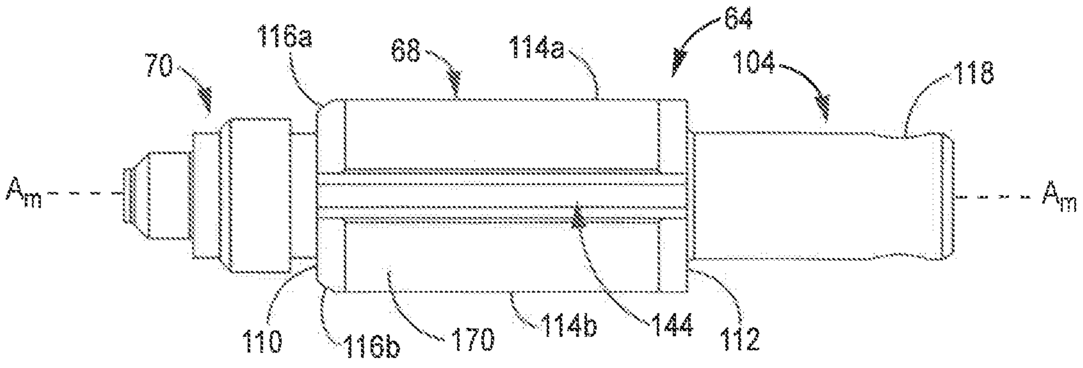
FIG. 6E is a second plan view of the mix chamber shown in FIG. 6A.

FIG. 6A is an isometric view of mix chamber 64. FIG. 6B is a top plan view of mix chamber 64. FIG. 6C is a left side elevation view of mix chamber 64. FIG. 6D is a right side elevation view of mix chamber 64. FIG. 6E is a bottom plan view of mix chamber 64. FIGS. 6A-6E will be discussed together. Mix chamber 64 includes body 68, head 70, spray orifice 72, and tail 104. Body 68 includes first body end 110; second body end 112; lateral sides 114*a*, 114*b*; ramps 116*a*, 116*b*; top side 168; and bottom side 170. Lateral sides 114*a*, 114*b* respectively include inlet ports 172*a*, 172*b*. Tail 104 includes pin bore 118. Bottom side 170 includes slot 144. Mix chamber 64 is elongate along chamber axis $A_M$-$A_M$.

Head 70 extends from first body end 110 of body 68. Head 70 is configured to connect to an air cap, such as air cap 28 (FIGS. 1A-3B). For example, head 70 can include external threading configured to connect to external threading on the air cap. Tail 104 extends from second body end 112 of body 68. Pin bore 118 extends laterally through tail 104. Tail 104 is configured to receive a connector, such as chamber connector 66 (FIGS. 1B-3B and 10A-10B) that facilitates connecting mix chamber 64 to an actuator of a plural component sprayer, such as actuator 16 (best seen in FIGS. 2A and 3A) of plural component sprayer 10 (best seen in FIGS. 1A and 1B). A pin can extend through pin bore 118 to secure the connector to tail 104.

Slot 144 is formed on bottom side 170 of mix chamber 64. Slot 144 extends axially along body 68 from first body end 110 to second body end 112. Slot 144 is configured to receive a projection, such as locating pin 142 (FIG. 3B), a fin, a rail, or other such projection. The projection can be formed in central bore 34 (FIGS. 1B-4B) of mounting head 18 (best seen in FIGS. 4A-4C) and/or formed in cartridge bore 54 (FIGS. 1B-3B, 5A, and 5B) of fluid cartridge 20 (best seen in FIGS. 5A and 5B). Slot 144 receiving the projection provides mistake-proofing by preventing a user from inadvertently installing mix chamber 64 in an inverted position. In addition, slot 144 provides a keying feature to prevent installation of an incorrect mix chamber in plural component sprayer 10. While slot 144 is described as formed on bottom side 170, it is understood that slot 144 can be formed on top side 168. While slot 144 is shown as extending from first body end 110 to second body end 112, it is understood that slot 144 can extend partway along the axial length of body 68 such that slot 144 includes one open end and one closed end.

Inlet ports 172*a*, 172*b* extend into lateral sides 114*a*, 114*b*, respectively. Inlet ports 172*a*, 172*b* receive component materials and purge air and communicate the component materials and purge air to inlet bores 106*a*, 106*b* (FIGS. 2B and 10B) and a material pathway in mix chamber 64, such as to mix bore 108 (FIGS. 2B, 3B, and 10B). Spray orifice 72 is disposed at the distal end of head 70 opposite first body end 110. Spray orifice 72 emits the material and air from the material pathway.

Lateral sides 114*a*, 114*b* are flat sides disposed on opposite sides of body 68. First body end 110 is disposed orthogonal to lateral sides 114*a*, 114*b*. Top side 168 extends between lateral sides 114*a*, 114*b* and is curved in the example shown. Bottom side 170 extends between lateral sides 114*a*, 114*b* and is curved in the example shown.

Ramp 116*a* is disposed between first body end 110 and lateral side 114*a* and forms a transition between first body end 110 and lateral side 114*a*. Ramp 116*b* is disposed between first body end 110 and lateral side 114*b* and forms a transition between first body end 110 and lateral side 114*b*. Ramps 116*a*, 116*b* together form a ramp feature of mix chamber 64. In the example shown, ramps 116*a*, 116*b* are integrally formed on mix chamber 64.

As shown in FIG. 6B, ramp 116*a* is disposed at angle θ and ramp 116*b* is disposed at angle β. Angle θ is between about 7-30 degrees. Angle β is between about 7-30 degrees. In some examples, angle θ and angle β have the same value, but it is understood that angle θ and angle β can differ.

As shown in FIG. 6C, ramp 116*a* has a height H1, while the flat portion forming lateral side 114*a* has a height H2. Height H1 is smaller than height H2. It is understood, however, that in some examples height H1 is the same as or larger than height H2. As shown in FIG. 6D, ramp 116*b* has height H3 and the flat portion forming lateral side 114*b* has a height H4. Height H3 is smaller than height H4. It is understood, however, that in some examples height H3 is the same as or larger than height H4.

Ramps 116*a*, 116*b* facilitate installation of mix chamber 64 in fluid cartridge 20. Side seals 88*a*, 88*b* (FIGS. 2A and 2B) project into the central bore 34 and are pre-loaded such that a spring force biases the seal members 102*a*, 102*b* (FIGS. 2A and 2B) into central bore. During installation, mix chamber 64 is pushed past side seals 88*a*, 88*b* and side seals 88*a*, 88*b* engage and seal against lateral sides 114*a*, 114*b*, respectively. Ramps 116*a*, 116*b* are the first part of mix chamber 64 to engage the side seals 88*a*, 88*b* during installation. Ramps 116*a*, 116*b* push seal members 102*a*, 102*b* away from axis A-A (best seen in FIG. 2B) such that the gap between side seals 88*a*, 88*b* widens to a sufficient width for side seals 88*a*, 88*b* to pass onto and engage lateral sides 114*a*, 114*b*.

Mix chamber 64 provides significant advantages. Mix chamber 64 is easily insertable and removable from fluid cartridge 20 to allow for simple and easy replacement by the user. Ramps 116*a*, 116*b* facilitate installation within fluid cartridge 20 by engaging pre-loaded side seals 88*a*, 88*b* and widening the gap between the pre-loaded side seals 88*a*, 88*b* to allow the side seals 88*a*, 88*b* to engage lateral sides 114*a*, 114*b*. Ramps 116*a*, 116*b* are sloped such that ramps 116*a*, 116*b* do not damage the sealing surfaces of side seals 88*a*, 88*b*.

Figure 7A:
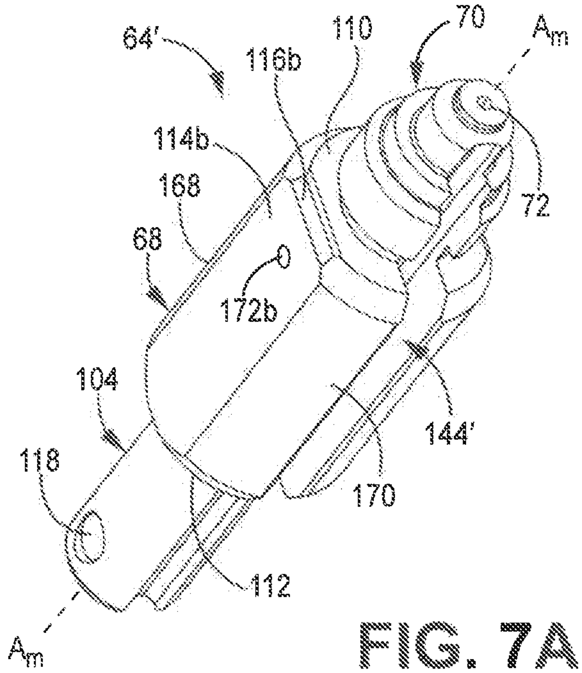
FIG. 7A is an isometric view of a mix chamber.
Figure 7B:
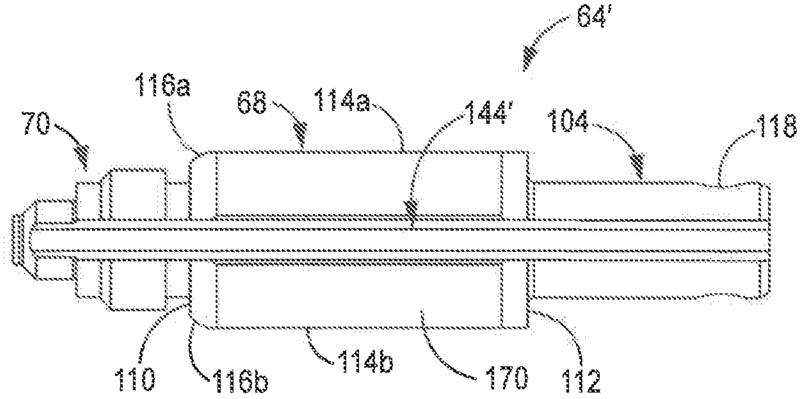
FIG. 7B is a plan view of the mix chamber shown in FIG. 7A.

FIG. 7A is an isometric view of mix chamber 64'. FIG. 7B is a bottom plan view of mix chamber 64'. FIGS. 7A and 7B will be discussed together. Mix chamber 64' includes body 68, head 70, spray orifice 72, and tail 104. Body 68 includes first body end 110, second body end 112, lateral sides 114*a*, 114*b*; ramps 116*a*, 116*b*; groove 144'; top side 168; and bottom side 170. Lateral sides 114*a*, 114*b* respectively include inlet ports 172*a*, 172*b* (only inlet port 172*b* is shown). Tail 104 includes pin bore 118. Mix chamber 64' is elongate along chamber axis $A_M$-$A_M$.

Mix chamber 64' is substantially similar to mix chamber 64 (best seen in FIGS. 6A-6E). Groove 144' extends axially along mix chamber 64' and is formed on head 70, body 68, and tail 104. More specifically, groove 144' extends further into bottom side 170 of mix chamber 64' than groove 144 (FIGS. 3B, 6A, and 6E). As such, groove 144' forms a "deep groove." Groove 144' is configured to receive a projection, such as a pin, a fin, a rail, or other such projection, formed in central bore 34 (best seen in FIGS. 2B and 3B) of mounting head 18 (best seen in FIGS. 4A-4C) and/or formed in cartridge bore 54 (best seen in FIGS. 2B and 3B) of fluid cartridge 20 (best seen in FIGS. 2B, 3B, 5A, and 5B). Groove 144' receiving the projection provides mistake-proofing by preventing a user from inadvertently installing mix chamber 64' in an inverted position. In addition, groove 144' provides a keying feature to prevent installation of an incorrect mix chamber in plural component sprayer 10 (best seen in FIGS. 1A and 1B). While groove 144' is described as formed on bottom side 170, it is understood that groove 144' can be formed on top side 168.

Figure 8A:
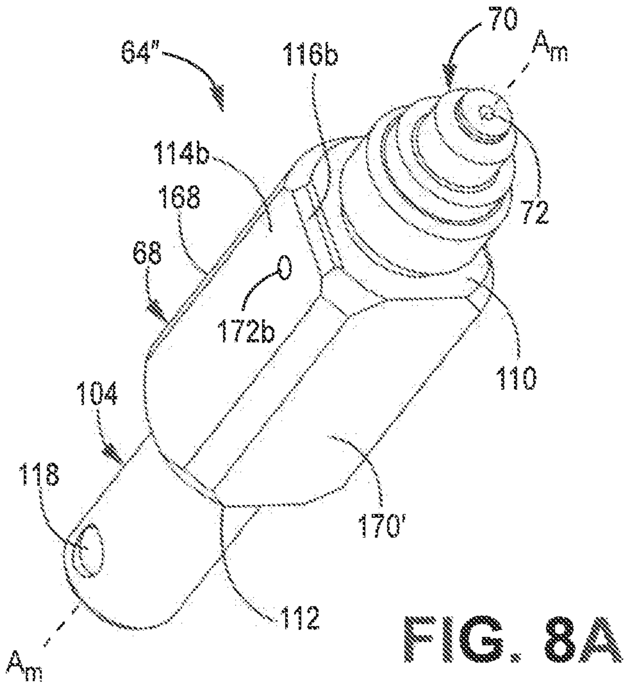
FIG. 8A is an isometric view of a mix chamber.
Figure 8B:
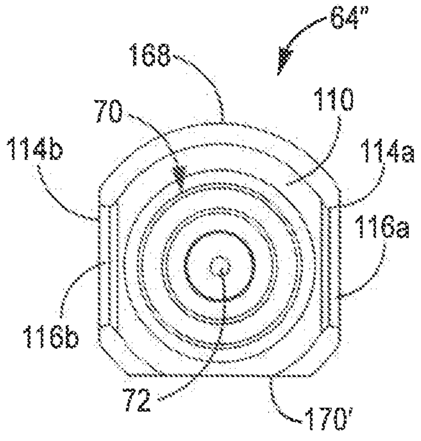
FIG. 8B is a front elevation view of the mix chamber shown in FIG. 8A.

FIG. 8A is an isometric view of mix chamber 64". FIG. 8B is a front elevation view of mix chamber 64". FIGS. 8A and 8B will be discussed together. Mix chamber 64" includes body 68, head 70, tail 104, and spray orifice 72. Body 68 includes first body end 110, second body end 112, lateral sides 114*a*, 114*b*; ramps 116*a*, 116*b*; top side 168; and bottom side 170'. Lateral sides 114*a*, 114*b* respectively include inlet ports 172*a*, 172*b* (only inlet port 172*b* is shown). Tail 104 includes pin bore 118. Mix chamber 64" is elongate along chamber axis $A_M$-$A_M$.

Mix chamber 64" is substantially similar to mix chamber 64 (best seen in FIGS. 6A-6D) and mix chamber 64' (FIGS. 7A and 7B). Bottom side 170' of mix chamber 64" is flat and extends between lateral sides 114*a*, 114*b* and between first body end 110 and second body end 112. As best seen in FIG. 8B, bottom side 170' is disposed transverse to lateral sides 114*a*, 114*b*. In the example shown, bottom side 170' is disposed orthogonal to lateral sides 114*a*, 114*b*, but it is understood that bottom side 170' can be disposed at other orientations transverse to lateral sides 114*a*, 114*b*.

Bottom side 170' is formed as a flat side to mate with a correspondingly flat portion central bore 34 (best seen in FIGS. 2B and 3B) of mounting head 18 (best seen in FIGS. 4A-4C) and/or formed in cartridge bore 54 (best seen in FIGS. 2B and 3B) of fluid cartridge 20 (best seen in FIGS. 2B, 3B, 5A, and 5B). Bottom side 170' being flat while top side 168 is rounded provides mistake-proofing by preventing a user from inadvertently installing mix chamber 64" in an inverted position. In addition, mix chamber 64" including three flat sides (lateral sides 114*a*, 114*b* and bottom side 170') provides a keying feature to prevent installation of an incorrect mix chamber in plural component sprayer 10 (best seen in FIGS. 1A and 1B). While bottom side 170' is described as flat, it is understood that top side 168 can be flat and bottom side 170' can be rounded. In another example, both bottom side 170' and top side 168 can be flat such that body 68 has a substantially square cross-section orthogonal to axis $A_M$-$A_M$. The substantially square cross-section can be formed with or without contoured/shaped edges.

Figure 9A:
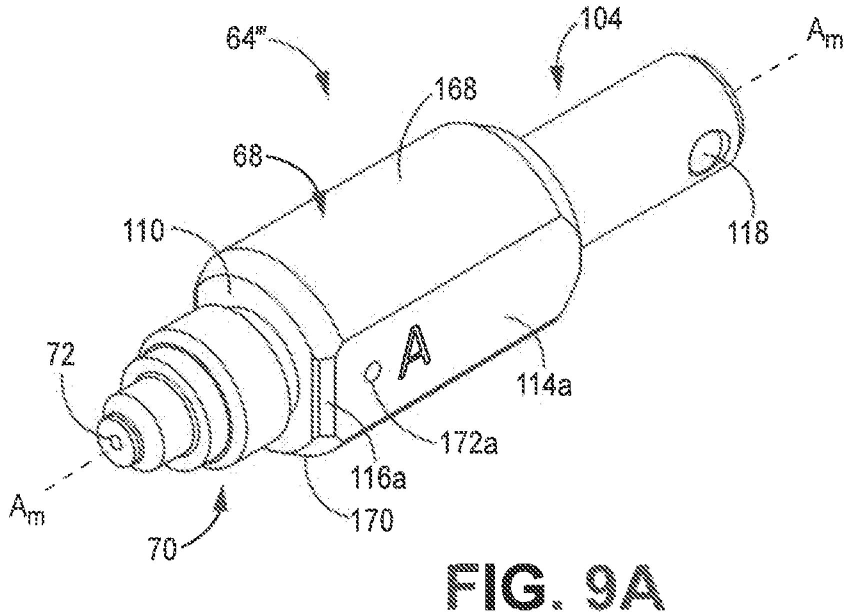
FIG. 9A is a first isometric view of a mix chamber.
Figure 9B:
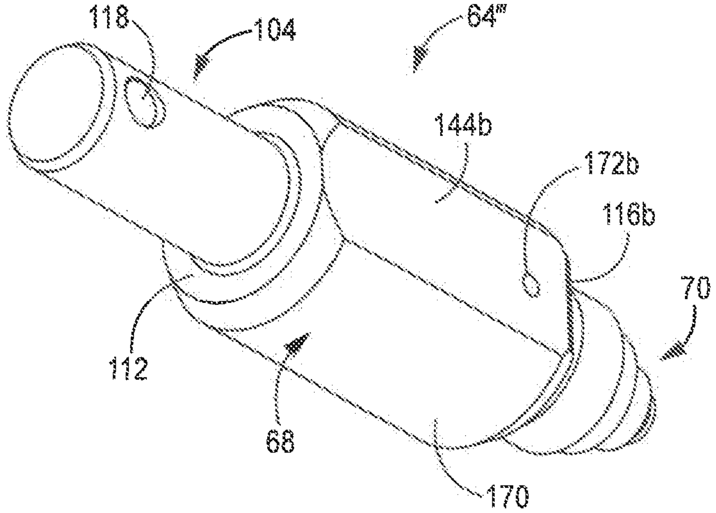
FIG. 9B is a second isometric view of the mix chamber shown in FIG. 9A.
Figure 10A:
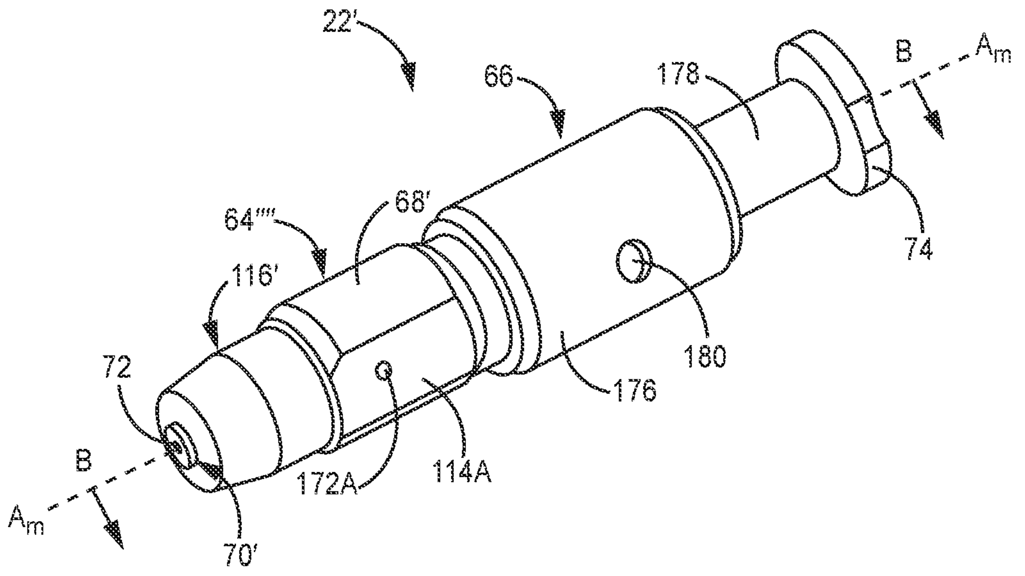
FIG. 10A is an isometric view of a mix chamber assembly.
Figure 10B:
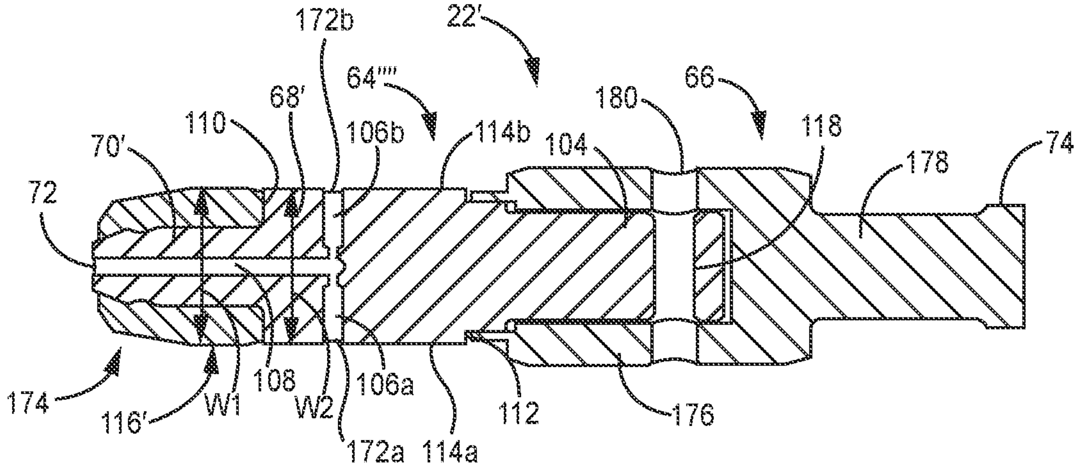
FIG. 10B is a cross-sectional view taken along line B-B in FIG. 10A.

FIG. 9A is a first isometric view of mix chamber 64'". FIG. 9B is a second isometric view of mix chamber 64'". FIGS. 9A and 9B will be discussed together. Mix chamber 64' includes body 68, head 70, tail 104, and spray orifice 72. Body 68 includes first body end 110, second body end 112, lateral sides 114*a*, 114*b*; ramps 116*a*, 116*b*; top side 168; and bottom side 170. Lateral sides 114*a*, 114*b* respectively include inlet ports 172*a*, 172*b*. Tail 104 includes pin bore 118. Mix chamber 64'" is substantially similar to mix chamber 64 (best seen in FIGS. 6A-6D), mix chamber 64' (FIG. 7), and mix chamber 64" (FIG. 8).

FIG. 10A is an isometric view of mix chamber assembly 22'. FIG. 10B is a cross-sectional view of mix chamber assembly 22' taken along line B-B in FIG. 10A. FIGS. 10A and 10B will be discussed together. Mix chamber assembly 22' includes mix chamber 64"" and chamber connector 66. Mix chamber 64"" includes body 68'; head 70'; spray orifice 72; tail 104; inlet bores 106*a*, 106*b*; mix bore 108; and ramp 116'. Body 68' includes first body end 110, second body end 112, lateral sides 114*a*, 114*b*; top side 168; and bottom side 170. Lateral sides 114*a*, 114*b* respectively include inlet ports 172*a*, 172*b*. Tail 104 includes pin bore 118. Ramp 116' includes contoured end 174. Chamber connector 66 includes locking tab 74, attachment portion 176, and shaft 178. Attachment portion 176 includes openings 180.

Mix chamber assembly 22' is substantially similar to mix chamber assembly 22 (FIGS. 1B-3B). Mix chamber 64"" is substantially similar to mix chamber 64 (best seen in FIGS. 6A-6E), mix chamber 64' (FIG. 7), mix chamber 64" (FIG. 8), and mix chamber 64'" (FIG. 9). Ramp 116' is disposed on head 70'. Ramp 116' forms a ramping feature of mix chamber 64"", similar to the ramping feature formed by ramps 116*a*, 116*b* (best seen in FIGS. 6B-6D).

Chamber connector 66 is attached to mix chamber 64"" to form mix chamber assembly 22'. While chamber connector 66 is shown as separately formed and attached to mix chamber 64"", it is understood that, in some examples, chamber connector 66 and mix chamber 64"" can be integrally formed to provide a unitary mix chamber assembly 22'. Chamber connector 66 can be removably or permanently mounted to mix chamber 64"". In the example shown, attachment portion 176 receives tail 104 and a locking device, such as a pin, dowel, other similar device, is inserted through pin bore 118 and openings 180 to secure chamber connector 66 to mix chamber 64"". While chamber connector 66 and mix chamber 64"" are described as attached by a pin connection, it is understood that any suitable connecting interface can be used, such as threading, press-fitting, or a bayonet connection, among other options Shaft 178 extends from attachment portion 176 to locking tab 74. Locking tab 74 projects radially from the end of shaft 178. Locking tab 74 secures mix chamber assembly 22' to actuator 16 (best seen in FIGS. 2A and 3A) such that actuator 16 can drive mix chamber assembly 22' between states.

Head 70' extends from first body end 110. Ramp 116' is mounted on head 70'. In some examples, ramp 116' is removable from head 70' such that ramp 116' can be removed and replaced. Body 68' and head 70' can be formed from a durable material, such as hardened steel or other similar metals, or suitably rigid plastics or polymers. Such durable material can damage seal members 102*a*, 102*b* (best seen in FIG. 2B) as mix chamber assembly 22' passes under the pre-loaded seal members 102*a*, 102*b* during installation.

Ramp 116' includes contoured end 174 and can be composed of a plastic or other suitably compliant material. Ramp 116' does not include any sharp edges and is suitably compliant such that ramp 116' does not score or otherwise damage seal members 102*a*, 102*b*. Ramp 116' is the first part of mix chamber 64'''' to engage side seals 88*a*, 88*b* (best seen in FIG. 2B) during installation. Contoured end 174 engages seal members 102*a*, 102*b* and pushes the seal members 102*a*, 102*b* away from axis A-A (best seen in FIG. 2B) such that the gap between side seals 88*a*, 88*b* widens to width W1, which is the widest portion of ramp 116'. Lateral sides 114*a*, 114*b* are spaced by width W2. In some examples, width W1 is larger than width W2 such that seal members 102*a*, 102*b* are spaced further apart than lateral sides 114*a*, 114*b* to facilitate lateral sides 114*a*, 114*b* passing under and being engaged by seal members 102*a*, 102*b*. Width W1 being wider than width W2 also prevents seal members 102*a*, 102*b* from inadvertently contacting the corners between first body end 110 and lateral sides 114*a*, 114*b*. In some examples, width W1 is the same as width W2.

Mix chamber assembly 22' provides significant advantages. Chamber connector 66 facilitates mounting of various mix chambers 64, 64', 64'', 64''', 64'''' using a single chamber connector 66. The mix chambers can be changed to provide optimal spraying. The mounting capabilities provided by chamber connector 66 provides a modular plural component sprayer 10 (best seen in FIGS. 1A and 1B). Chamber connector 66 also provides quick-change capabilities by providing a tool-less connection with actuator 16. Ramp 116' allows mix chamber assembly 22' to be inserted past pre-loaded side seals 88*a*, 88*b*. Ramp 116' lifts seal members 102*a*, 102*b* away from lateral sides 114*a*, 114*b* to seat seal members 102*a*, 102*b* on lateral sides 114*a*, 114*b* rather than a ground corner of body 68'. Ramp 116' can be formed from a polymer or other soft material, relative to body 68', lengthening the life of side seals 88*a*, 88*b*.

Figure 11:
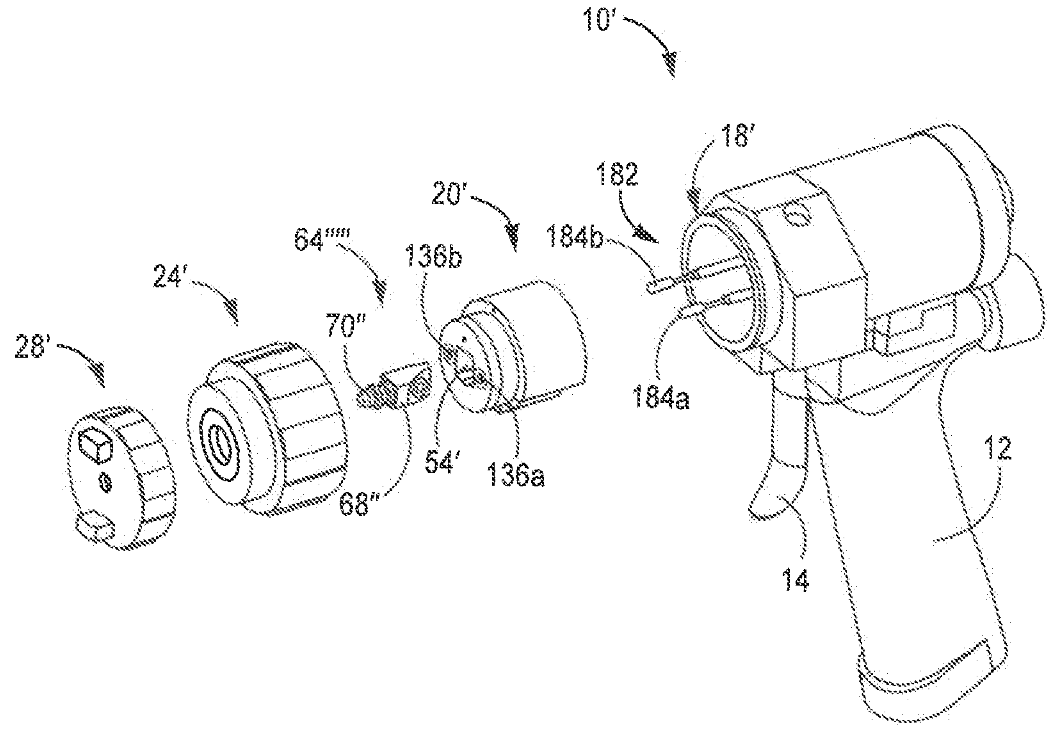
FIG. 11 is an isometric, partially exploded view of a plural component sprayer.

FIG. 11 is an isometric, partially exploded view of plural component sprayer 10'. Plural component sprayer 10' includes handle 12, trigger 14, mounting head 18', fluid cartridge 20', retaining cap 24', air cap 28', mix chamber 64''''', and valve 182. Cartridge bore 54' and purge ports 136*a*, 136*b* or fluid cartridge 20' are shown. Needles 184*a*, 184*b* of valve 182 are shown. Mix chamber 64''''' includes body 68'' and head 70''.

Fluid cartridge 20' is substantially similar to fluid cartridge 20 (best seen in FIGS. 5A and 5B). Fluid and air seals are disposed in fluid cartridge 20'. Purge ports 136*a*, 136*b* extend into fluid cartridge 20' to provide purge air to mix chamber 64'''''. Mix chamber 64''''' is substantially similar to mix chamber 64 (best seen in FIGS. 6A-6E), mix chamber 64' (FIGS. 7A and 7B), mix chamber 64'' (FIGS. 8A and 8B), mix chamber 64''' (FIGS. 9A and 9B), and mix chamber 64'''' (FIGS. 10A and 10B), except mix chamber 64''''' remains stationary throughout operation. Cartridge bore 54' extends partway into fluid cartridge 20' and is open only through the end of fluid cartridge 20'. Body 68'' is received by cartridge bore 54'. Body 68'' and cartridge bore 54' can be contoured to form a tight-fit interface between body 68'' and cartridge bore 54' to facilitate sealing.

Needles 184*a*, 184*b* are formed as part of valve 182 and extend from actuator 16 (best seen in FIGS. 2A and 3A). Each needle 184*a*, 184*b* extends into a material bore, similar to material passages 80*a*, 80*b* (FIG. 2B), formed in fluid cartridge 20'. Seals are disposed in the material bores and needles 184*a*, 184*b* interface with the seals to control flow of the first and second component materials through fluid cartridge 20' to mix chamber 64'''''.

Retaining cap 24' attaches to plural component sprayer 10' to secure fluid cartridge 20' within plural component sprayer 10'. For example, retaining cap 24' can include threading configured to interface with threading on plural component sprayer 10'. In the example shown, fluid cartridge 20' is disposed within mounting head 18' that is integrally formed as part of the body of plural component sprayer 10'. Air cap 28' mounts to retaining cap 24'. One of air cap 28' and retaining cap 24' can contact a shoulder of mix chamber 64''''' to push mix chamber 64''''' further into cartridge bore 54', enhancing sealing between mix chamber 64''''' and cartridge bore 54'.

During operation, needles 184*a*, 184*b* translate axially to control the flow of the first and second component materials to mix chamber 64''''' and to control the flow of purge air through purge ports 136*a*, 136*b* to mix chamber 64'''''.

Fluid head 20' incorporates various sealing components into one cartridge, which results in quicker head changes compared to the prior plural component heads used to apply binary compounds, like epoxy, which required that the point where the two components combine be cleaned or replaced regularly in order to operate. Fluid cartridge 20' may be disposable to minimize servicing time and for easy preventive maintenance.

During assembly, fluid cartridge 20' is inserted into plural component sprayer 10' such that needles 136*a*, 136*b* extend into fluid cartridge 20'. Mix chamber 64''''' is inserted into cartridge bore 54'. Retaining cap 24' is attached to plural component sprayer 10 and air cap 28' is attached to retaining cap 24'. Plural component sprayer 10' is thus assembled for operation. Plural component sprayer 10' can be easily disassembled by a reverse process. Air cap 28' is removed. With air cap 28' removed, mix chamber 64''''' can be pulled through the opening in retaining cap 24', in some examples. To remove fluid cartridge 20', retaining cap 24' is removed. Fluid cartridge 20' can then be pulled out of plural component sprayer 10' and off of needles 184*a*, 184*b*. Plural component sprayer 10' can be reassembled with a new fluid cartridge 20' and/or mix chamber 64''''' to resume spraying.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A plural component sprayer comprising:

a gun body;

a handle depending from the gun body;

a trigger supported by the gun body and configured to be actuated to cause spraying by the plural component sprayer;

a mix chamber disposed at least partially within a bore disposed in the plural component sprayer extending along a spray axis of the plural component sprayer and, the mix chamber comprising:

a chamber body extending between a first end and a second end and elongate along a body axis;

a first inlet bore extending into a first side of the chamber body and to a mix bore extending to a spray orifice, the first inlet bore configured to receive a first component material into the chamber body;

a second inlet bore extending into a second side of the chamber body and to the mix bore, the second inlet bore configured to receive a second component material into the chamber body; and wherein the mix chamber interfaces with the plural component sprayer within the bore at a keyed interface, the keyed interface formed by a projection extending in to a slot;

wherein the mix chamber is movable along the body axis to fluidly connect and disconnect the first inlet bore from a flow of the first component material and to fluidly connect and disconnect the second inlet bore from a flow of the second component material.

2. The plural component sprayer of claim 1, wherein the slot extends into one of a top side and a bottom side of the chamber body.

3. The plural component sprayer of claim 2, wherein the mix chamber further comprises:

a head extending from the first end.

4. The plural component sprayer of claim 3, wherein the head includes an exterior threading.

5. The plural component sprayer of claim 4, further comprising:

an air cap threadedly connected to the exterior threading on the head.

6. The plural component sprayer of claim 3, wherein the slot extends into the head.

7. The plural component sprayer of claim 6, wherein the mix chamber further comprises:

a tail extending from the second end, wherein the slot extends into the tail.

8. The plural component sprayer of claim 1, wherein the mix chamber further comprises:

a tail extending from the second end; and a chamber connector mounted to the tail, the chamber connector including a mount configured to connect the mix chamber to a piston of the plural component sprayer.

9. The plural component sprayer of claim 8, wherein the mount includes a locking tab projecting from an end of the chamber connector opposite the mix chamber and outward away from the body axis.

10. The plural component sprayer of claim 9, wherein the tail extends into the chamber connector.

11. The plural component sprayer of claim 10, wherein the tail includes a pin bore and the chamber connector includes an opening aligned with the pin bore.

12. The plural component sprayer of claim 1, further comprising:

a piston connected to the mix chamber and configured to displace the mix chamber along the body axis.

13. The plural component sprayer of claim 1, wherein the first side is a first flat lateral side.

14. The plural component sprayer of claim 13, wherein the second side is a second flat lateral side.

15. The plural component sprayer of claim 2, further comprising:

a fluid cartridge supported by the gun body, the fluid cartridge defining a first material pathway configured to provide the flow of the first component material to the mix chamber and defining a second material pathway configured to provide the flow of the second component material to the mix chamber, wherein the bore is at least partially formed in the fluid cartridge.

16. The plural component sprayer of claim 15, wherein the projection extends from a cartridge body of the cartridge.

17. The plural component sprayer of claim 15, wherein the cartridge includes a first side seal configured to sealingly engage with the first side and the cartridge includes a second side seal configured to sealingly engage with the second side.

18. The plural component sprayer of claim 2, wherein the slot extends partway along a length of the chamber body such that the slot includes one open end and one closed end.

19. The plural component sprayer of claim 2, wherein the slot extends into at least one of a top side of the chamber body and a bottom side of the chamber body.

20. A plural component sprayer comprising:

a gun body;

a handle depending from the gun body;

a trigger supported by the gun body and configured to be actuated to cause spraying by the plural component sprayer;

a projection extending into a gun bore formed within the plural component sprayer, the gun bore extending along a spray axis of the plural component sprayer;

a mix chamber disposed at least partially within the gun bore, the mix chamber comprising:

a chamber body extending between a first end and a second end and elongate along a body axis;

a first inlet bore extending into a first side of the chamber body and to a mix bore extending to a spray orifice, the first inlet bore configured to receive a first component material into the chamber body;

a second inlet bore extending into a second side of the chamber body and to the mix bore, the second inlet bore configured to receive a second component material into the chamber body;

a slot extending into the chamber body, the slot receiving the projection such that the projection is disposed within the slot; and a head extending from the first end; and an air cap mounted to the head;

wherein the mix chamber is movable along the body axis to fluidly connect and disconnect the first inlet bore from a flow of the first component material and to fluidly connect and disconnect the second inlet bore from a flow of the second component material.

* * * * *